(12) United States Patent
Chai

(10) Patent No.: US 10,200,287 B2
(45) Date of Patent: Feb. 5, 2019

(54) NETWORK RESOURCE PROCESSING APPARATUS, METHOD, AND SYSTEM

(71) Applicant: Huawei Technologies Co., Ltd., Shenzhen (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 15/272,542

(22) Filed: Sep. 22, 2016

(65) Prior Publication Data

US 2017/0012879 A1 Jan. 12, 2017

Related U.S. Application Data

(63) Continuation of application No. PCT/CN2014/087637, filed on Sep. 28, 2014.

(30) Foreign Application Priority Data

Mar. 31, 2014 (CN) .......................... 2014 1 0127405

(51) Int. Cl.
*H04L 12/813* (2013.01)
*H04L 12/64* (2006.01)
(Continued)

(52) U.S. Cl.
CPC ................ *H04L 47/20* (2013.01); *G06F 9/50* (2013.01); *H04L 12/6418* (2013.01);
(Continued)

(58) Field of Classification Search
None
See application file for complete search history.

(56) References Cited

U.S. PATENT DOCUMENTS

2008/0021987 A1 1/2008 Bates et al.
2010/0005472 A1 1/2010 Krishnaraj et al.
(Continued)

FOREIGN PATENT DOCUMENTS

CN 101309201 A 11/2008
CN 2008138255 A 11/2008
(Continued)

OTHER PUBLICATIONS

Machine Translation and Abstract of Chinese Publication No. CN103294521, Sep. 11, 2013, 9 pages.
(Continued)

*Primary Examiner* — Hassan A Phillips
*Assistant Examiner* — Gautam Sharma
(74) *Attorney, Agent, or Firm* — Conley Rose, P.C.

(57) ABSTRACT

A network resource processing apparatus, method, and system, which is used to resolve a communication congestion problem between network devices during network resource processing, is presented. A receiving module receives computation environment information that are corresponding to a computation task and network information of each computation node, provides the computation environment information to a bandwidth decision module and a generation module, and provides the network information of each computation node to the generation module; the bandwidth decision module decides a to-be-allocated bandwidth for the computation task according to the computation environment information; the generation module generates routing configuration policy information for the computation task according to the network information of each computation node, the decided to-be-allocated bandwidth, and the computation environment information, and provides the routing configuration policy information to a sending module; and the sending module sends the routing configuration policy information to a routing configuration controller.

12 Claims, 10 Drawing Sheets

(51) Int. Cl.
  *H04L 12/24* (2006.01)
  *H04L 12/801* (2013.01)
  *H04L 12/931* (2013.01)
  *G06F 9/50* (2006.01)

(52) U.S. Cl.
  CPC ...... *H04L 41/0893* (2013.01); *H04L 41/0896* (2013.01); *H04L 47/12* (2013.01); *H04L 49/35* (2013.01)

(56) References Cited

U.S. PATENT DOCUMENTS

| | | | | |
|---|---|---|---|---|
| 2010/0202465 | A1* | 8/2010 | Sakata | H04L 45/00 370/400 |
| 2011/0271007 | A1* | 11/2011 | Wang | H04L 45/306 709/238 |
| 2011/0296052 | A1* | 12/2011 | Guo | G06F 9/5077 709/240 |
| 2013/0060940 | A1* | 3/2013 | Koponen | H04L 12/4633 709/225 |
| 2013/0318268 | A1* | 11/2013 | Dalal | G06F 13/1652 710/113 |
| 2014/0201761 | A1* | 7/2014 | Dalal | G06F 13/16 718/108 |
| 2014/0233424 | A1* | 8/2014 | Cvijetic | H04W 16/18 370/254 |
| 2014/0355436 | A1* | 12/2014 | Zhang | H04L 47/10 370/232 |

FOREIGN PATENT DOCUMENTS

| | | |
|---|---|---|
| CN | 102377598 A | 3/2012 |
| CN | 102611735 A | 7/2012 |
| CN | 103294521 A | 9/2013 |
| CN | 103905337 A | 7/2014 |
| WO | 2008138255 A1 | 11/2008 |
| WO | 2012027478 A1 | 3/2012 |
| WO | 2013076775 A1 | 5/2013 |
| WO | 2013077787 A1 | 5/2013 |

OTHER PUBLICATIONS

Machine Translation and Abstract of Chinese Publication No. CN103905337, Part 1, Jul. 2, 2014, 16 pages.
Machine Translation and Abstract of Chinese Publication No. CN103905337, Part 2, Jul. 2, 2014, 5 pages.
Foreign Communication From A Counterpart Application, Chinese Application No. 201410127405.1, Chinese Office Action dated Jul. 4, 2016, 8 pages.
Foreign Communication From A Counterpart Application, European Application No. 14888126.1, Extended European Search Report dated Mar. 10, 2017, 10 pages.
Foreign Communication From A Counterpart Application, PCT Application No. PCT/CN2014/087637, English Translation of International Search Report dated Dec. 31, 2014, 2 pages.
Foreign Communication From A Counterpart Application, PCT Application No. PCT/CN2014/087637, English Translation of Written Opinion dated Dec. 31, 2014, 12 pages.

* cited by examiner

NETWORK RESOURCE PROCESSING APPARATUS, METHOD, AND SYSTEM

CROSS-REFERENCE TO RELATED APPLICATIONS

This application is a continuation of International Application No. PCT/CN2014/087637, filed on Sep. 28, 2014, which claims priority to Chinese Patent Application No. 201410127405.1, filed on Mar. 31, 2014, both of which are hereby incorporated by reference in their entireties.

TECHNICAL FIELD

The present disclosure relates to the field of communications network technologies, and in particular, to a network resource processing apparatus, method, and system.

BACKGROUND

When data that requires more computation resources is being processed, the data is usually divided, and then multiple pieces of partial data obtained through division are allocated to multiple computation nodes for processing. After processing the allocated partial data to obtain partial computation results, the computation nodes collect the partial computation results obtained by these computation nodes through processing, to obtain a computation result corresponding to the data, which is distributed computing.

In the prior art, when distributed computing is used, a scheduler platform first decomposes a received computation task submitted by user equipment (UE), and then sends a computation resource application request to a computation resource manager. The computation resource application request includes at least a quantity of computation nodes. After receiving the computation resource application request, the computation resource manager allocates computation nodes for the computation task according to the quantity of computation nodes, and then feeds back, to the scheduler platform, a computation resource application response that carries an allocation result. The allocation result includes information about the allocated computation nodes. The scheduler platform sends each piece of partial computation subtasks obtained through decomposition to the corresponding computation nodes and then collects partial computation results from the computation nodes, thereby completing processing of data that requires more computation resources. One computation node executes one piece of partial computation subtask.

However, when a prior-art manner is used to process data (a computation task) that requires more computation resources, after a scheduler platform delivers computation subtasks to allocated computation nodes, a network device (for example, a switch or a router) can perform routing control only according to a pre-configured static policy when there are more data exchanged between the computation nodes. As a result, communication congestion may occur between network devices.

SUMMARY

Embodiments of the present disclosure provide a network resource processing apparatus, method, and system, and are used to resolve a communication congestion problem between network devices during network resource processing.

According to a first aspect, an embodiment of the present disclosure provides a routing policy decider, including a receiving module configured to receive computation environment information that are corresponding to a computation task and network information of each computation node, which are transferred by a scheduler platform, provide the computation environment information to a bandwidth decision module and a generation module, and provide the network information of each computation node to the generation module; the bandwidth decision module configured to decide a to-be-allocated bandwidth for the computation task according to the computation environment information; the generation module configured to generate routing configuration policy information for the computation task according to the network information of each computation node, the decided to-be-allocated bandwidth, and the computation environment information, and provide the routing configuration policy information to a sending module; and the sending module configured to send the routing configuration policy information to a routing configuration controller.

With reference to the first aspect, in another implementation manner of the first aspect, the network information of each computation node includes an Internet Protocol (IP) address and a port number that are corresponding to the computation node, and the computation environment information includes a status of the computation task; and the generation module is configured to, when the status of the computation task is pause, generate the routing configuration policy information for the computation task according to the network information of each computation node and the decided to-be-allocated bandwidth; or when the status of the computation task is running, generate the routing configuration policy information for the computation task according to the network information of each computation node and the decided to-be-allocated bandwidth and according to a first predetermined policy.

With reference to the first aspect and any implementation manner of the foregoing implementation manners of the first aspect, in another implementation manner of the first aspect, the computation environment information further includes a computation task priority; and the first predetermined policy includes the generation module is further configured to, when the status of the computation task is running and the computation task priority is greater than or equal to a predetermined threshold, generate the routing configuration policy information for the computation task according to the network information of each computation node and the decided to-be-allocated bandwidth during current routing configuration, where the predetermined threshold is used to measure the computation task priority; or when the status of the computation task is running and the computation task priority is less than a predetermined threshold, generate the routing configuration policy information for the computation task according to the network information of each computation node and the decided to-be-allocated bandwidth when next routing configuration needs to be performed.

According to a second aspect, an embodiment of the present disclosure provides a scheduler platform, including a receiving module configured to receive computation task description information submitted by UE, and provide the computation task description information to an obtaining module, a decomposition module, and a generation module, where the computation task description information includes a user identity (ID) and required information about a computation node; the obtaining module configured to obtain, according to the computation task description information, a computation task corresponding to the user ID; the decomposition module configured to decompose the computation task into at least one sub computation task according to the required information about the computation node, where the obtaining module is further configured to obtain network information of each corresponding computation node for processing each sub computation task, and provide the network information of each computation node to a first sending module; the generation module configured to generate computation environment information of the computation task according to the computation task description information, and provide the computation environment information to the first sending module; and the first sending module configured to send the computation environment information and the network information of each computation node to a routing policy decider.

With reference to the second aspect, in another implementation manner of the second aspect, the network information of each computation node includes an IP address and a port number that are corresponding to the computation node; and the scheduler platform further includes a designation module and a second sending module, where the second sending module is configured to send a respective corresponding sub computation task to each computation node according to the network information of each computation node, and provide sending completion information to the designation module, where the sending completion information is used to notify the designation module that the at least one sub computation task has been sent; the designation module is configured to designate a status of the computation task and provide the status of the computation task to the generation module; and the generation module is further configured to generate the computation environment information of the computation task according to the computation task description information and the status of the computation task.

According to a third aspect, an embodiment of the present disclosure provides a network resource processing method, including receiving, by a routing policy decider, computation environment information that are corresponding to a computation task and network information of each computation node, which are transferred by a scheduler platform; deciding, by the routing policy decider, a to-be-allocated bandwidth for the computation task according to the computation environment information; generating, by the routing policy decider, routing configuration policy information for the computation task according to the network information of each computation node, the decided to-be-allocated bandwidth, and the computation environment information; and sending, by the routing policy decider, the routing configuration policy information to a routing configuration controller.

With reference to the third aspect, in another implementation manner of the third aspect, the network information of each computation node includes an IP address and a port number that are corresponding to the computation node; the computation environment information includes a status of the computation task; and the generating, by the routing policy decider, routing configuration policy information for the computation task according to the network information of each computation node, the decided to-be-allocated bandwidth, and the computation environment information includes, when the status of the computation task is pause, generating, by the routing policy decider, the routing configuration policy information for the computation task according to the network information of each computation node and the decided to-be-allocated bandwidth; or when the status of the computation task is running, generating, by the routing policy decider, the routing configuration policy information for the computation task according to the network information of each computation node and the decided to-be-allocated bandwidth and according to a first predetermined policy.

With reference to the third aspect and any implementation manner of the foregoing implementation manners of the third aspect, in another implementation manner of the third aspect, the computation environment information further includes a computation task priority; and the first predetermined policy includes, when the status of the computation task is running and the computation task priority is greater than or equal to a predetermined threshold, the routing policy decider generates the routing configuration policy information for the computation task according to the network information of each computation node and the decided to-be-allocated bandwidth during current routing configuration, where the predetermined threshold is used to measure the computation task priority; or when the status of the computation task is running and the computation task priority is less than a predetermined threshold, the routing policy decider generates the routing configuration policy information for the computation task according to the network information of each computation node and the decided to-be-allocated bandwidth when next routing configuration needs to be performed.

With reference to the third aspect and any implementation manner of the foregoing implementation manners of the third aspect, in another implementation manner of the third aspect, the network information of each computation node includes an IP address and a port number that are corresponding to the computation node; the computation environment information includes a computation task priority; and the generating, by the routing policy decider, routing configuration policy information for the computation task according to the network information of each computation node, the decided to-be-allocated bandwidth, and the computation environment information includes, when the computation task priority is greater than or equal to a predetermined threshold, generating, by the routing policy decider, the routing configuration policy information for the computation task according to the network information of each computation node and the decided to-be-allocated bandwidth, where the predetermined threshold is used to measure the computation task priority; or when the computation task priority is less than a predetermined threshold, generating, by the routing policy decider, the routing configuration policy information for the computation task according to the network information of each computation node and the decided to-be-allocated bandwidth and according to a first predetermined policy.

With reference to the third aspect and any implementation manner of the foregoing implementation manners of the third aspect, in another implementation manner of the third aspect, the computation environment information further includes a status of the computation task; and the first predetermined policy includes, when the computation task priority is less than the predetermined threshold and the status of the computation task is pause, the routing policy decider generates the routing configuration policy information for the computation task according to the network information of each computation node and the decided to-be-allocated bandwidth during current routing configuration or when next routing configuration needs to be performed; or when the computation task priority is less than the predetermined threshold and the status of the computation task is running, the routing policy decider generates the routing configuration policy information for the computation task according to the network information of each computation node and the decided to-be-allocated bandwidth when next routing configuration needs to be performed.

According to a fourth aspect, an embodiment of the present disclosure provides another network resource processing method, including receiving, by a scheduler platform, computation task description information submitted by UE, where the computation task description information includes a user identity ID and required information about a computation node; obtaining, by the scheduler platform according to the computation task description information, a computation task corresponding to the user ID; decomposing, by the scheduler platform, the computation task into at least one sub computation task according to the required information about the computation node, and obtaining network information of each corresponding computation node for processing each sub computation task; generating, by the scheduler platform, computation environment information of the computation task according to the computation task description information; and sending, by the scheduler platform, the computation environment information and the network information of each computation node to the routing policy decider.

According to a fifth aspect, an embodiment of the present disclosure provides a network resource processing system, including a routing policy decider configured to receive computation environment information that are corresponding to a computation task and network information of each computation node, which are transferred by a scheduler platform; decide a to-be-allocated bandwidth for the computation task according to the computation environment information; generate routing configuration policy information for the computation task according to the network information of each computation node, the decided to-be-allocated bandwidth, and the computation environment information; and send the routing configuration policy information to a routing configuration controller; the scheduler platform configured to receive computation task description information submitted by UE, where the computation task description information includes a user identity ID and required information about a computation node; obtain, according to the computation task description information, a computation task corresponding to the user ID; decompose the computation task into at least one sub computation task according to the required information about the computation node, apply for a computation node for each sub computation task, and obtain the network information of each corresponding computation node for processing each sub computation task; generate the computation environment information of the computation task according to the computation task description information; and send the computation environment information and the network information of each computation node to the routing policy decider; and the routing configuration controller configured to receive the routing configuration policy information sent by the routing policy decider.

The embodiments of the present disclosure provide a network resource processing apparatus, method, and system. In the prior art, when data (a computation task) that requires more computation resources is being processed, after a scheduler platform delivers a quantity of computation subtasks to allocated computation nodes, a network device (for example, a switch or a router) can perform routing only according to a pre-configured static policy when there are more data exchanged between the computation nodes, resulting in a communication congestion problem between network devices. Compared with the problem, in the embodiments of the present disclosure, a scheduler platform sends obtained computation environment information and obtained network information of each computation node to a receiving module of a routing policy decider, a generation module of the routing policy decider generates routing configuration policy information according to the computation environment information and the network information of each computation node that are provided by the scheduler platform; then, a sending module of the routing policy decider delivers the routing configuration policy information to a routing configuration controller, so that a switch (a network device) finally performs routing control on data according to the routing configuration policy information, thereby avoiding communication congestion between network devices during network resource processing.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

Figure 1:
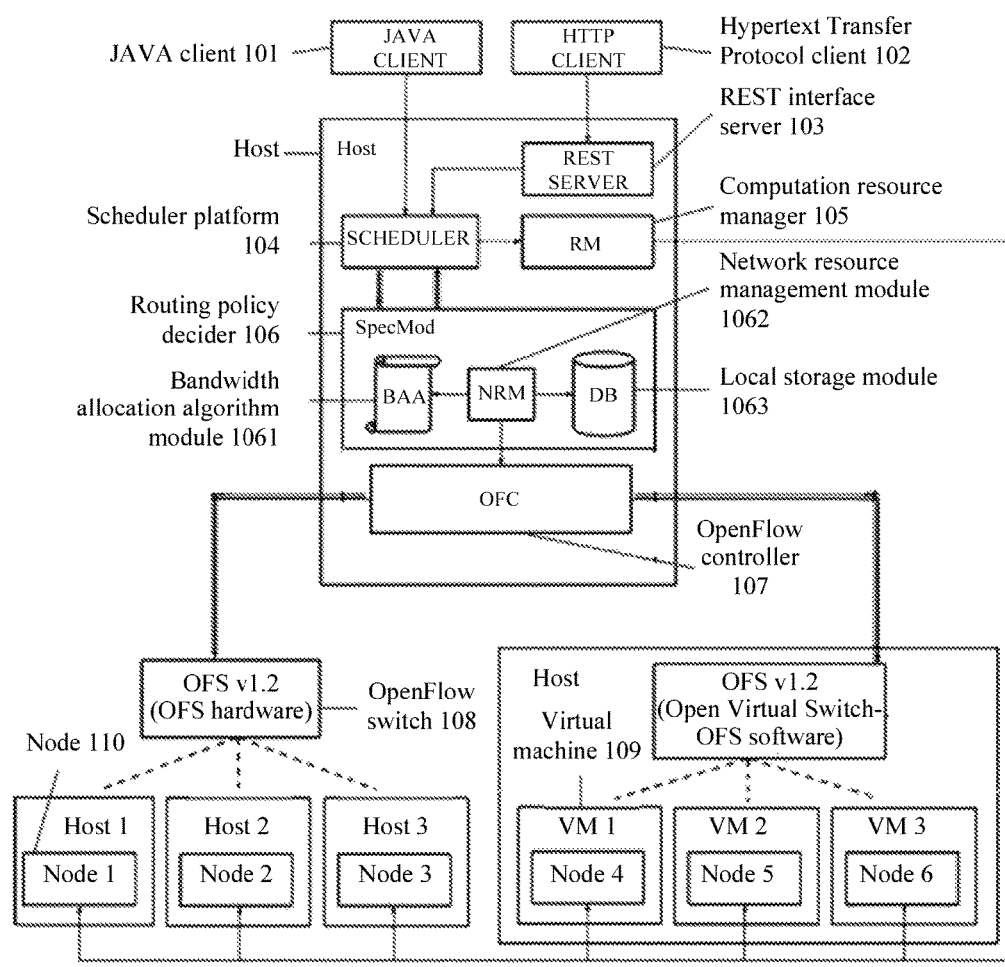
FIG. 1 is a schematic structural diagram of a network resource processing system according to an embodiment of the present disclosure.

A network resource processing apparatus in the present disclosure is applicable to a network resource processing system. As shown in FIG. 1, the system 10 may include a JAVA client 101, a Hypertext Transfer Protocol client (HTTP CLIENT) 102, Representational State Transfer server (REST Server) 103, a scheduler platform 104, a computation resource manager (RM) 105, a routing policy decider (specifically represented as SpecMod in the FIG. 106, a bandwidth allocation algorithm (BAA) module 1061, a network resource manager (NRM) module 1062, a database (DB) module 1063, an OpenFlow controller (OFC) 107, an OpenFlow switch (OFS) 108, a virtual machine (VM) 109, and a node 110.

The JAVA CLIENT 101 is a JAVA client program configured to submit a computation task to the scheduler platform 104.

The HTTP CLIENT 102 is an HTTP client program configured to submit a computation task to the scheduler platform 104 using the REST Server 103.

The REST SERVER 103 is configured to encapsulate a capability of the scheduler platform 104, to provide an interface with better performance to a user.

The scheduler platform 104 is configured to verify a computation task; apply for a resource (that is, a computation node) for processing the computation task from the RM 105; schedule and monitor the computation task; and perform an operation such as processing a result of the computation task.

The RM 105 is configured to receive registration of a computation node and manage a registered computation node. Managing a computation node includes detecting a status of the computation node and allocating a computation node to the computation task in the scheduler platform 104.

SpecMod is the routing policy decider 106. A function of the SpecMod module includes providing guaranteed routing policy information for communication between computation nodes for a computation task. For ease of description, a routing policy decider is used for description in the present disclosure.

The BAA module 1061 included in the SpecMod module is configured to generate routing configuration policy information for a computation task according to information provided by the scheduler platform 104, such as related information of the computation task (including a status of the computation task, a computation task priority, and the like) or network information of each computation node.

The NRM module 1062 is an internal core module of the SpecMod module, and is configured to call the BAA module 1061 to generate the routing configuration policy information for the computation task.

The DB module 1063 is configured to store content related to the generated routing configuration policy information.

The OFC 107 is configured to control the OFS, which includes computing a routing path, maintaining a status of the OFS, configuring a routing policy executable by the OFS.

The OFS 108 is a switching device supporting OpenFlow, may be physical or virtual, and is configured to execute a routing policy provided by the OFC 107 for routing and QoS guarantees.

The VM 109 is a virtual device configured to process a computation task.

The NODE 110 is a Java process running on a physical machine (HOST) or the VM 109, and may be connected to the RM 105 to report a process status, or may be connected to the scheduler platform 104 to report an execution status of a sub computation task, or the like.

With reference to FIG. 1, the routing policy decider 106 that is included in this solution is configured to receive computation environment information that are corresponding to a computation task and network information of each computation node, which are sent by the scheduler platform 104; decide a to-be-allocated bandwidth for the computation task according to the computation environment information; generate routing configuration policy information for the computation task according to the network information of each computation node, the decided to-be-allocated bandwidth, and the computation environment information; and send the routing configuration policy information to a routing configuration controller, where the routing configuration controller may be the OFC 107 in FIG. 1.

The scheduler platform 104 is configured to receive computation task description information submitted by a UE, where the computation task description information includes a user ID and required information about a computation node; obtain, according to the computation task description information, the computation task corresponding to the user ID; decompose the computation task into at least one sub computation task according to the required information about the computation node, apply for a computation node for each sub computation task, and obtain the network information of each corresponding computation node for processing each sub computation task; generate the computation environment information of the computation task according to the computation task description information, where the computation environment information is information that is necessary for the routing policy decider 106 to generate the routing configuration policy information corresponding to the computation task; send the computation environment information and the network information of each computation node to the routing policy decider 106.

The routing configuration controller 107 is configured to receive the routing configuration policy information sent by the routing policy decider.

The routing configuration policy information may include routing information corresponding to each computation node. The routing information corresponding to each computation node may be used to perform routing control for the computation task.

It should be noted that the computation task description information further includes bandwidth requirement information, and the computation environment information includes at least one piece of the following information the user ID, the required information about the computation node, the bandwidth requirement information, the status of the computation task, or the computation task priority.

It should be noted that the required information about the computation node includes a quantity of computation nodes and/or configuration information of a computation node.

Further, the RM 105 is configured to receive a computation node allocation request that carries the required information about the computation node and that is sent by the scheduler platform 104; and allocate a computation node for the computation task according to the quantity of computation nodes and the configuration information of the computation node that are in the computation node allocation request, and return the information about the computation node to the scheduler platform 104, where the information about the computation node includes the network information of each computation node.

The computation node 110 is configured to receive a sub computation task sent by the scheduler platform 104.

It can be understood that the computation node 110 may be a general term for computation nodes for processing all sub computation tasks, or may be a corresponding computation node for processing one sub computation task.

Correspondingly, the scheduler platform 104 is further configured to decompose the computation task into at least one sub computation task; send the at least one sub computation task to the corresponding computation node 110; send, to the computation RM 105, the computation node allocation request that carries the quantity of computation nodes and the configuration information of the computation node; and receive the information about the computation node sent by the computation RM 105.

The switch 108 is configured to receive OpenFlow configuration policy information sent by the routing configuration controller 107; and perform routing control for the computation task according to the OpenFlow configuration policy information. The switch in this solution may be the OFS 108.

Correspondingly, the routing configuration controller 107 is further configured to convert the received routing configuration policy information into the OpenFlow configuration policy information; and send the OpenFlow configuration policy information to the switch 108.

Further, optionally, the routing configuration policy information (the OpenFlow configuration policy information) may further include node bandwidth information, related to the routing information, corresponding to each computation node.

When the network information of each computation node that is sent by the scheduler platform 104 to the routing policy decider 106 includes an IP address, a port number, and a media access control (MAC) address that are corresponding to each computation node, the routing configuration policy information generated by the routing policy decider 106 includes the routing information corresponding to each computation node. Preferably, the routing configuration policy information may further include the node bandwidth information corresponding to each computation node.

When the network information of each computation node that is sent by the scheduler platform 104 to the routing policy decider 106 further includes information about communication between the computation nodes, the routing configuration policy information generated by the routing policy decider 106 includes inter-node bandwidth information of the computation nodes.

It can be understood that a resource may be reserved for the computation task according to the node bandwidth information corresponding to each computation node or the inter-node bandwidth information between the computation nodes. The resource reservation may include quality of service (QoS) reservation, a bandwidth dedicated for routing a computation task, and the like.

Further, it should be noted that the scheduler platform is further configured to send a sub computation task to the computation node 110, and designate a status of the computation task, where the status of the computation task is any one of the following: running, pause, end, or error; and generate the computation environment information of the computation task according to the computation task description information and the status of the computation task.

Further, it should be noted that the scheduler platform 104 is further configured to obtain a user level according to the user ID; and generate a computation task priority according to the user level corresponding to the user ID and a computation task level. The user level may be included in subscription information of a user, or a service level for a user may be allocated according to subscription information of the user.

Further, it should be noted that the scheduler platform 104 is further configured to generate the computation environment information according to the computation task description information, the status of the computation task, and the computation task priority.

Further, it should be noted that the scheduler platform 104 is further configured to change the status of the computation task to obtain a changed status of the computation task, where the changed status of the computation task is any one of the following: running, pause, end, or error; and send the changed status of the computation task to the routing policy decider 106, where the changed status of the computation task is used for the routing policy decider to determine whether to release a resource corresponding to the routing configuration policy information that is corresponding to the computation task. The status of the computation task is changed preferably according to a user instruction, for example, pause or stop, according to a preparation status of the computation node, for example, preparation of the computation node is complete or the computation node reports an error, according to an execution status of the computation task, for example, an error occurs during execution of the computation task, or the like.

Correspondingly, the routing policy decider 106 is further configured to receive the changed status of the computation task sent by the scheduler platform 104; and when the status of the computation task is changed from running to end or is changed from running to error, release, according to a second predetermined policy, the resource corresponding to the routing configuration policy information that is corresponding to the computation task.

The second predetermined policy may be setting a time interval (the time interval is greater than or equal to 0, for example, execution is performed currently or the time interval is 10 s), or when the routing policy decider 106 performs next routing configuration (that is, the routing policy decider 106 configures corresponding routing configuration policy information for any computation task, in other words, the routing policy decider 106 configures new routing configuration policy information), releasing the resource corresponding to the routing configuration policy information that is corresponding to the computation task.

An embodiment of the present disclosure provides a network resource processing system. In the prior art, when data (that is, a computation task) that requires more computation resources is being processed, after a scheduler platform delivers a quantity of computation subtasks to allocated computation nodes, a network device (for example, a switch or a router) can perform routing only according to a pre-configured static policy when there are more data exchanged between the computation nodes, resulting in a communication congestion problem between network devices. Compared with the problem, in this embodiment of the present disclosure, a scheduler platform sends obtained computation environment information and obtained network information of each computation node to a routing policy decider and because the routing policy decider generates routing configuration policy information according to the computation environment information and the network information of each computation node that are provided by the scheduler platform, a network status and a bandwidth requirement of a computation task are considered in advance for routing control and/or resource reservation, thereby avoiding communication congestion between network devices during network resource processing.

Figure 2:
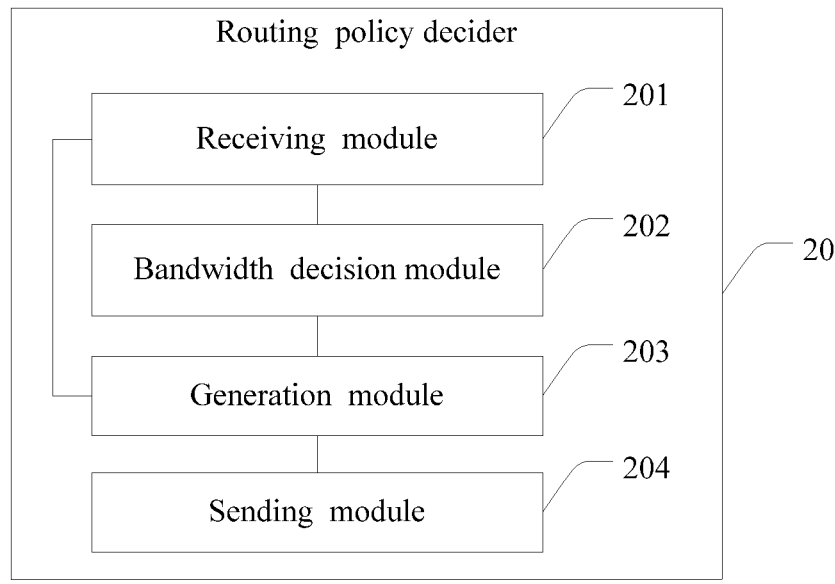
FIG. 2 is a schematic structural diagram of a routing policy decider according to an embodiment of the present disclosure.

FIG. 2 shows a network resource processing apparatus according to an embodiment of the present disclosure, and is a schematic structural diagram of a routing policy decider. The routing policy decider 20 in FIG. 2 includes a receiving module 201, a bandwidth decision module 202, a generation module 203, and a sending module 204. The routing policy decider 20 in FIG. 2 may be the routing policy decider 106 in FIG. 1.

The receiving module 201 is configured to receive computation environment information that are corresponding to a computation task and network information of each computation node and that are transferred by a scheduler platform, provide the computation environment information to the bandwidth decision module 202 and the generation module 203, and provide the network information of each computation node to the generation module 203.

The receiving module 201 may receive the computation environment information corresponding to the computation task and the network information of each computation node corresponding to the computation task; or the receiving module 201 may receive the computation environment information corresponding to the computation task and network information of all computation nodes.

The bandwidth decision module 202 is configured to decide a to-be-allocated bandwidth for the computation task according to the computation environment information, and provide the decided to-be-allocated bandwidth to the generation module 203.

The generation module 203 is configured to generate routing configuration policy information for the computation task according to the network information of each computation node, the decided to-be-allocated bandwidth, and the computation environment information, and provide the routing configuration policy information to the sending module 204.

The generation module 203 generates the routing configuration policy information for the computation task according to the network information of each computation node, the decided to-be-allocated bandwidth, and the computation environment information. Preferably, when the routing configuration policy information is being generated, a status of a network topology is further considered, where the status of the network topology is a status of a physical layout in which various devices are interconnected using a transmission medium.

The sending module 204 is configured to send the routing configuration policy information to a routing configuration controller.

This solution decides a to-be-allocated bandwidth for a computation task using obtained computation environment information and obtained network information of each computation node from a scheduler platform, and generates routing configuration policy information. When this solution is implemented corresponding to the system architecture in FIG. 1, a switch (a network device) finally performs routing control according to OpenFlow configuration policy information obtained through conversion by the routing configuration controller, thereby avoiding communication congestion between network devices during network resource processing.

Figure 3:
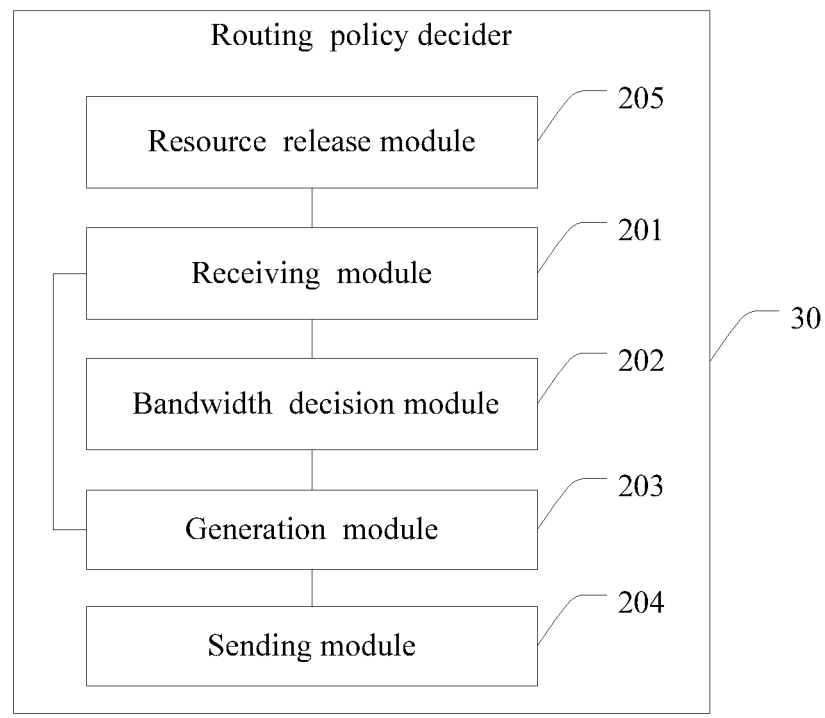
FIG. 3 is a schematic structural diagram of a routing policy decider according to an embodiment of the present disclosure.

Further, the present disclosure further provides another routing policy decider 30. As shown in FIG. 3, the routing policy decider 30 further includes a resource release module 205.

The resource release module 205 is configured to, when a status of the computation task is changed from running to end or is changed from running to error, release, according to a second predetermined policy, a resource corresponding to the routing configuration policy information that is corresponding to the computation task. The status of the computation task is changed preferably according to a user instruction, for example, pause or stop, according to a preparation status of the computation node, for example, preparation of the computation node is complete or the computation node reports an error, according to an execution status of the computation task, for example, an error occurs during execution of the computation task, or the like.

Correspondingly, the receiving module 201 is further configured to receive a changed status of the computation task sent by the scheduler platform, and provide the changed status of the computation task to the resource release module 205, where the changed status of the computation task is any one of the following: running, pause, end, or error.

The second predetermined policy may be setting a time interval (the time interval is greater than or equal to 0, for example, execution is performed currently or the time interval is 10 s), or when the generation module 203 performs next routing configuration (that is, the generation module 203 configures corresponding routing configuration policy information for any computation task), releasing the resource corresponding to the routing configuration policy information that is corresponding to the computation task.

Further, optionally, the computation environment information includes bandwidth requirement information, where the bandwidth requirement information includes a computation task type and/or information about a required bandwidth. The bandwidth decision module 202 is configured to decide the to-be-allocated bandwidth for the computation task according to at least one piece of information in the bandwidth requirement information. In addition, when the computation environment information does not include the bandwidth requirement information, the bandwidth decision module 202 obtains a user level according to a user ID in the computation environment information and decides the to-be-allocated bandwidth for the computation task according to the user level.

Further, optionally, according to different information included in the computation environment information, the generation module 203 of the routing policy decider generates the routing configuration policy information for the computation task in different manners, which are as follows.

Manner 1: if the computation environment information includes a status of the computation task, the generation module 203 is configured to, when the status of the computation task is pause, generate the routing configuration policy information for the computation task according to the network information of each computation node and the decided to-be-allocated bandwidth during current routing configuration, and apply the generated routing configuration policy information to the current computation task; or when the status of the computation task is running, generate the routing configuration policy information for the computation task according to the network information of each computation node and the decided to-be-allocated bandwidth and according to a first predetermined policy.

The first predetermined policy is a predetermined time or a predetermined configuration manner.

Further, the computation environment information further includes a computation task priority. The first predetermined policy includes, when the status of the computation task is running and the computation task priority is greater than or equal to a predetermined threshold, the generation module 203 generates the routing configuration policy information for the computation task according to the network information of each computation node and the decided to-be-allocated bandwidth during current routing configuration, where the predetermined threshold is used to measure the computation task priority; or when the status of the computation task is running and the computation task priority is less than a predetermined threshold, the generation module 203 generates, when the computation task is still in the running state, the routing configuration policy information for the computation task according to the network information of each computation node and the decided to-be-allocated bandwidth when next routing configuration needs to be performed. The next routing configuration that needs to be performed may be performed at the time when the routing policy decider needs to generate a routing configuration policy information for another computation task, may be performed at the arrival of a predetermined time period, or the like (this explanation is also applicable to the other embodiments).

It should be noted that when needing to generate the routing configuration policy information for the computation task when next routing configuration needs to be performed, the generation module 203 needs to determine whether execution of the computation task has been completed. When the computation task is still being processed, the generation module 203 may generate new routing configuration policy information taking into consideration related information of the computation task (the network information of each computation node and the like) when next routing configuration needs to be performed. When processing of the computation task has been completed, the generation module 203 does not need to consider the related information of the computation task when generating a new routing configuration policy information.

Similarly, in this solution, a range of the predetermined threshold is not limited, and the predetermined threshold is determined according to level importance (priorities) of computation tasks.

Manner 2: If the computation environment information includes a computation task priority, the generation module 203 is configured to, when the computation task priority is greater than or equal to a predetermined threshold, generate the routing configuration policy information for the computation task according to the network information of each computation node and the decided to-be-allocated bandwidth during current routing configuration, where the predetermined threshold is used to measure the computation task priority; or when the computation task priority is less than a predetermined threshold, generate the routing configuration policy information for the computation task according to the network information of each computation node and the decided to-be-allocated bandwidth and according to a first predetermined policy.

The first predetermined policy in manner 2 is the same as the first predetermined policy in manner 1. The first predetermined policy includes (further, the computation environment information further includes a status of the computation task), when the computation task priority is less than the predetermined threshold and the status of the computation task is pause, the generation module 203 generates the routing configuration policy information for the computation task according to the network information of each computation node and the decided to-be-allocated bandwidth during current routing configuration or when next routing configuration needs to be performed, where whether the routing configuration policy information for the computation task is generated during current routing configuration or when next routing configuration needs to be performed may be pre-configured in the routing policy decider; or when the computation task priority is less than the predetermined threshold and the status of the computation task is running, the generation module 203 generates the routing configuration policy information for the computation task according to the network information of each computation node and the decided to-be-allocated bandwidth when next routing configuration needs to be performed.

It should be noted that in the two manners of generating, by the generation module 203, the routing configuration policy information for the computation task according to the network information of each computation node, the decided to-be-allocated bandwidth, and the computation environment information, preferentially considered conditions are different.

In manner 1, the status of the computation task is considered preferentially. When the status of the computation task is pause, the generation module 203 performs, during current routing configuration, an operation of generating the routing configuration policy information corresponding to the computation task. When the status of the computation task is running, the generation module 203 then considers whether the computation task priority is greater than or equal to the predetermined threshold, and when the computation task priority is greater than or equal to the predetermined threshold, the generation module 203 performs, during current routing configuration, an operation of generating the routing configuration policy information corresponding to the computation task; or when the computation task priority is less than the predetermined threshold, the generation module 203 performs, when next routing configuration needs to be performed, an operation of generating the routing configuration policy information corresponding to the computation task.

In manner 2, the computation task priority is considered preferentially. When the computation task priority is greater than or equal to the predetermined threshold, the generation module 203 performs, during current routing configuration, an operation of generating the routing configuration policy information corresponding to the computation task. When the computation task priority is less than the predetermined threshold, the generation module 203 then considers whether the status of the computation task is running or pause, and when the status of the computation task is pause, the generation module 203 performs, according to a predetermined time (during current or after a time), an operation of generating the routing configuration policy information corresponding to the computation task; or when the status of the computation task is running, the generation module 203 performs, according to a predetermined configuration manner (when next routing configuration is performed), an operation of generating the routing configuration policy information corresponding to the computation task.

According to the two manners, there are two network resource processing methods.

Method 1: After the scheduler platform delivers each sub computation task obtained through decomposition to a corresponding computation node, the generation module 203 of the routing policy decider preferentially configures routing configuration policy information corresponding to the computation task, and notifies, after the configuration is complete, the scheduler platform of completion of the configuration, so that the computation node starts processing the respective sub computation task. The notifying, after the configuration is complete, the scheduler platform of completion of the configuration may be notifying, by the routing policy decider after receiving a configuration success response from a switch, the scheduler platform of completion of the configuration. The routing policy decider sends the generated routing configuration policy information to the routing configuration controller, so that after converting the routing configuration policy information into OpenFlow configuration policy information, the routing configuration controller sends the OpenFlow configuration policy information to the switch, and the switch performs routing control and/or resource reservation for the computation task according to the OpenFlow configuration policy information.

It should be noted that because the generation module 203 of the routing policy decider generates dynamic routing configuration policy information according to the computation environment information, the network information of each computation node, and real-time network topology information, the switch may perform routing control and/or resource reservation for the computation task according to the generated dynamic routing configuration policy information, thereby avoiding communication congestion during data transmission. Method 1 is used when the user level is high or the computation task priority is high.

Method 2: After the scheduler platform delivers each sub computation task obtained through decomposition to a corresponding computation node, the computation node starts performing an operation of processing the respective sub computation task, and the generation module 203 of the routing policy decider decides, according to content of the computation environment information, when to generate the routing configuration policy information corresponding to the computation task. An operation performed after the generation module 203 generates the routing configuration policy information is the same as that in method 1. A difference is as follows. In the first network resource processing method, the computation node starts processing the respective sub computation task after the generation module 203 completes the configuration of the routing configuration policy information, and then, the switch performs data routing and QoS-based reservation according to the generated dynamic OpenFlow configuration policy information; in this case, QoS guarantees are provided for data communication for the computation task. In the second network resource processing method, executing a respective received sub computation task by each computation node and allocating the routing configuration policy information for the computation task are concurrent processes. A specific delay (a length of the delay is decided by the generation module 203 of the routing policy decider) is required for loading and taking effect of the routing configuration policy information. Therefore, before loading and taking effect of the routing configuration policy information allocated for the computation task, if there is a communication requirement for the computation task during execution, routing control and transmission control are performed for the computation task according to a routing configuration policy pre-configured by the switch (in this case, no QoS guarantee is provided for data communication for the computation task). During execution of the computation task, routing control and/or resource reservation is performed for the computation task according to the generated dynamic OpenFlow configuration policy information only after loading and taking effect of the routing configuration policy information allocated for the computation task (in this case, QoS guarantees are provided for data communication for the computation task).

It should be noted that method 2 is used when the user level is low or the computation task priority is low. In this manner, frequent network changes are reduced to the greatest extent to ensure network communication for a computation task and improve utilization of a network resource.

Further, optionally, the generation module 203 generates the routing configuration policy information for the computation task according to the network information of each computation node, the decided to-be-allocated bandwidth, and the computation environment information, which includes the routing configuration policy information may include routing information corresponding to each computation node. Further, optionally, the routing configuration policy information may further include node bandwidth information, related to the routing information, corresponding to each computation node.

When the network information includes an IP address, a port number, and a MAC address that are corresponding to each computation node, the generation module 203 generates the routing configuration policy information including the node bandwidth information corresponding to each computation node.

When the network information includes an IP address, a port number, and a MAC address that are corresponding to each computation node and information about communication between the computation nodes, the generation module 203 generates the routing configuration policy information including inter-node bandwidth information of the computation nodes.

For example, it is assumed that there are three nodes in the network information: a node A, a node B, and a node C, and a total bandwidth of the computation task is 9 M. To prevent a total communication bandwidth of nodes for the computation task from exceeding a decided total bandwidth, when the network information does not include the information about communication between the computation nodes, the routing configuration policy information generated by the generation module 203 includes reserving 6 M for a communications port of the node A, reserving 6 M for a communications port of the node B, and reserving 6 M for a communications port of the node C; when the network information includes the information about communication between the computation nodes, if the information about communication between the computation nodes is the node A and the node C interact with each other and the node B and the node C interact with each other, the routing configuration policy information generated by the generation module 203 includes reserving 9 M (or less than 9 M, according to a policy of itself) for a communications port of the node A, reserving 9 M (or less than 9 M, according to a policy of itself) for a communications port of the node B, and a bandwidth of 9 M is reserved for a communications port of the node C.

Figure 4:
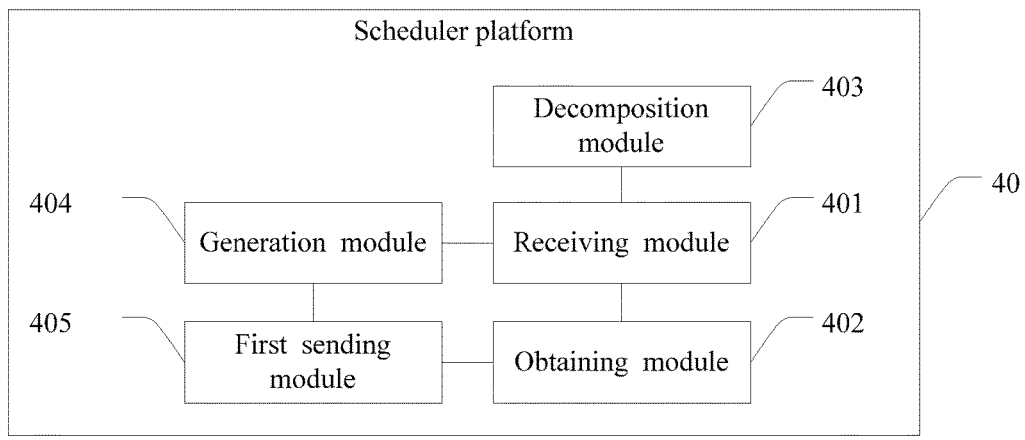
FIG. 4 is a schematic structural diagram of a scheduler platform according to an embodiment of the present disclosure.

FIG. 4 shows a network resource processing apparatus according to another embodiment of the present disclosure, and is a schematic structural diagram of a scheduler platform. The scheduler platform 40 in FIG. 4 includes a receiving module 401, an obtaining module 402, a decomposition module 403, a generation module 404, and a first sending module 405. The scheduler platform 40 in FIG. 4 may be the scheduler platform 104 in FIG. 1.

The receiving module 401 is configured to receive computation task description information submitted by a UE, and provide the computation task description information to the obtaining module 402, the decomposition module 403, and the generation module 404, where the computation task description information includes a user ID and required information about a computation node;

The obtaining module 402 is configured to obtain, according to the computation task description information, a computation task corresponding to the user ID.

The decomposition module 403 is configured to decompose the computation task into at least one sub computation task according to the required information about the computation node.

The obtaining module 402 is further configured to obtain network information of each corresponding computation node for processing each sub computation task, and provide the network information of each computation node to the first sending module 405.

The generation module 404 is configured to generate computation environment information of the computation task according to the computation task description information, and provide the computation environment information to the first sending module 405, where the computation environment information is information that is necessary for a routing policy decider to generate routing configuration policy information corresponding to the computation task.

The first sending module 405 is configured to send the computation environment information and the network information of each computation node to the routing policy decider.

Figure 5:
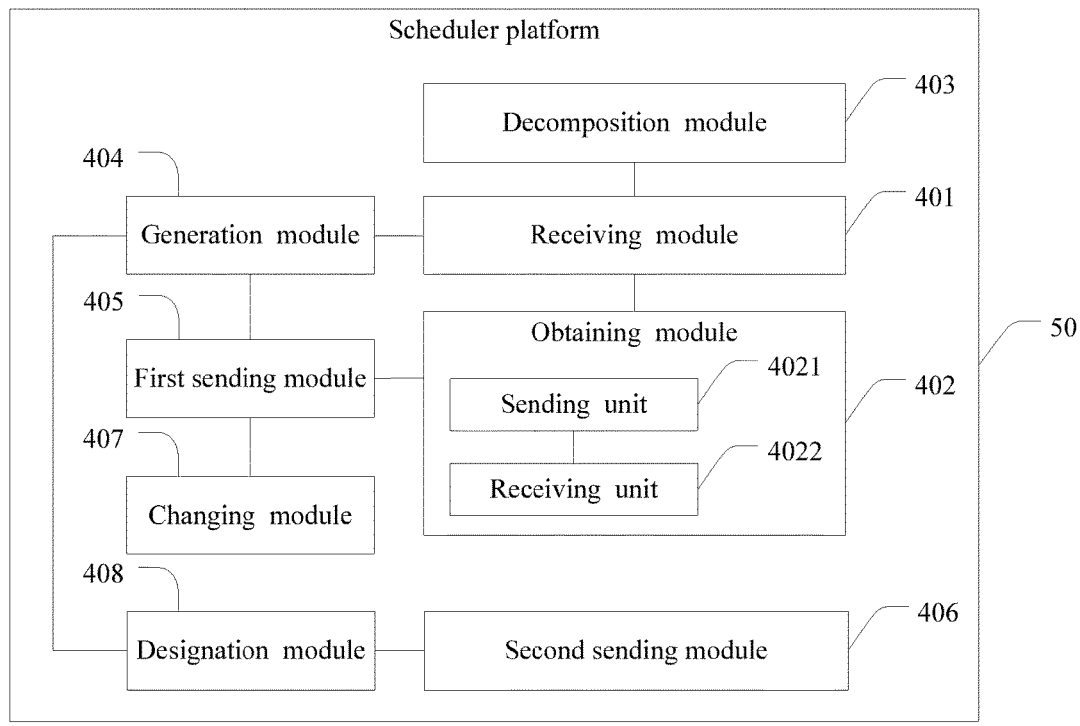
FIG. 5 is a schematic structural diagram of a scheduler platform according to an embodiment of the present disclosure.

Further, an embodiment of the present disclosure provides another scheduler platform 50. As shown in FIG. 5, the scheduler platform 50 further includes a second sending module 406, a designation module 407, and a changing module 408; and the obtaining module 402 includes a sending unit 4021 and a receiving unit 4022.

The second sending module 406 is further configured to send a respective corresponding sub computation task to each computation node according to the network information of each computation node, and provide sending completion information to the designation module 407, where the sending completion information is used to notify the designation module 407 that the at least one sub computation task has been sent.

The designation module 407 is configured to designate a status of the computation task and provide the status of the computation task to the generation module 404. The generation module 404 generates the computation environment information of the computation task according to the computation task description information and the status of the computation task.

Further, optionally, the computation task description information further includes a computation task level. The obtaining module 402 is further configured to obtain a user level according to the user ID, and provide the user level to the generation module 404. Then, the generation module 404 generates a computation task priority according to the user level and the computation task level.

Further, the generation module 404 generates the computation environment information according to the computation task description information and the computation task priority.

Further, optionally, the generation module 404 is further configured to generate the computation environment information according to the computation task description information, the status of the computation task, and the computation task priority.

It can be understood that the computation task description information may include the user ID, the required information about the computation node, bandwidth requirement information (optional), computation task obtaining information (optional), and a computation task level (optional). The computation environment information includes at least one piece of the following information: the user ID, the required information about the computation node, the bandwidth requirement information, the status of the computation task, or the computation task priority.

Further, it should be noted that in two manners, the obtaining module 402 obtains, according to the computation task description information, the computation task corresponding to the user ID.

Manner 1: The obtaining module 402 receives a computation task data packet sent by the UE, where the computation task data packet includes the computation task description information, and the obtaining module 402 parses the computation task data packet according to the computation task description information to obtain the computation task.

Manner 2: The obtaining module 402 obtains the computation task according to a computation task obtaining address or obtaining manner in the computation task description information.

Further, it should be noted that the decomposition module 403 decomposes the computation task into at least one sub computation task according to the required information about the computation node, which includes the required information about the computation node includes configuration information of a computation node and a quantity of computation nodes, where the configuration information of the computation node may include a hardware configuration (a memory, a central processing unit (CPU), a network, or the like), a software configuration (an operating system type or an application library), or the like. It can be understood that the decomposition module 403 decomposes the computation task into the at least one sub computation task according to the quantity of computation nodes.

Further, it should be noted that after the decomposition module 403 decomposes the computation task into the at least one sub computation task, the sending unit 4021 of the obtaining module 402 sends, to a computation resource manager, a computation node allocation request that carries the quantity of computation nodes and the configuration information of the computation node. After the computation resource manager configures the information about the computation node for the computation task according to content in the received computation node allocation request, and sends the configured information about the computation node to the scheduler platform, the receiving unit 4022 receives the information about the computation node sent by the computation resource manager, where the information about the computation node includes the network information of each computation node. The network information of each computation node includes one or more pieces of the following information: a remote access address, an IP address, a port number, or a MAC address corresponding to the computation node.

Further, optionally, the changing module 408 is configured to change the status of the computation task to obtain a changed status of the computation task, and provide the changed status of the computation task to the sending module 405, where the changed status of the computation task is any one of the following: running, pause, end, or error. Then, the sending module 405 sends the changed status of the computation task to the routing policy decider, where the changed status of the computation task is used for the routing policy decider to determine whether to release a resource corresponding to routing configuration policy information that is corresponding to the computation task. The status of the computation task is changed preferably according to a user instruction, for example, pause or stop, according to a preparation status of the computation node, for example, preparation of the computation node is complete or the computation node reports an error, according to an execution status of the computation task, for example, an error occurs during execution of the computation task, or the like.

In this solution, a generation module of a scheduler platform sends, to a routing policy decider, generated computation environment information and network information of each computation node obtained by an obtaining module of the scheduler platform, so that the routing policy decider generates routing configuration policy information according to the computation environment information and the network information of each computation node; then, the routing policy decider delivers the routing configuration policy information to a routing configuration controller, so that a switch (a network device) finally performs routing control and/or resource reservation according to OpenFlow configuration policy information obtained through conversion by the routing configuration controller, thereby avoiding communication congestion between network devices during network resource processing.

Figure 6:
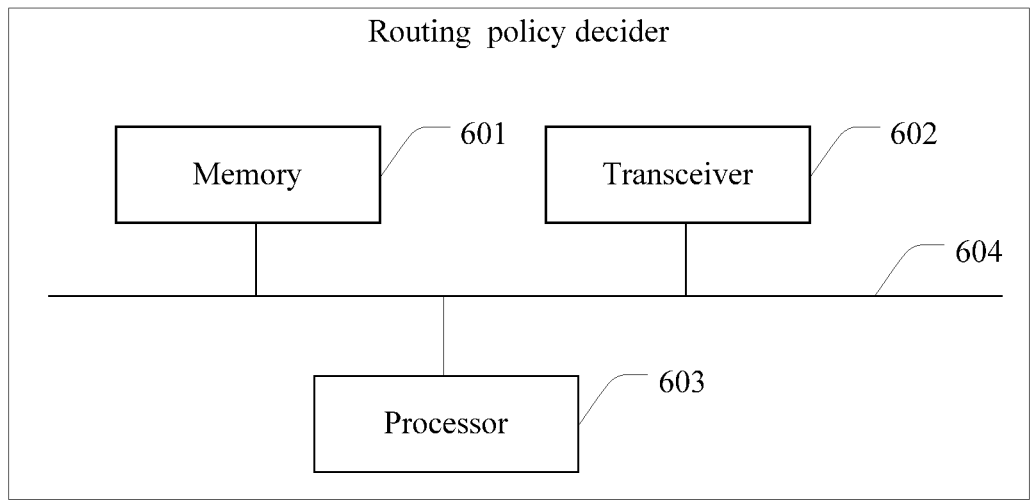
FIG. 6 is a hardware structure diagram of a routing policy decider in a network resource processing system according to an embodiment of the present disclosure.

As shown in FIG. 6, FIG. 6 is a hardware schematic structural diagram of a routing policy decider. The routing policy decider may include a memory 601, a transceiver 602, a processor 603, and a bus 604, where the memory 601, the transceiver 602, and the processor 603 are communicatively connected using the bus 604.

The memory 601 may be a read-only memory (ROM), a static storage device, a dynamic storage device, or a random access memory (RAM). The memory 601 may store an operating system and another application. When the technical solution provided in this embodiment of the present disclosure is implemented using software or firmware, program code used to implement the technical solution provided in this embodiment of the present disclosure is stored in the memory 601 and is executed by the processor 603.

The transceiver 602 is configured for communication between the routing policy decider and another device or a communications network (for example, but not limited to, Ethernet, a radio access network (RAN), a wireless local area network (WLAN), or the like).

The processor 603 may use a general-purpose CPU, a microprocessor, an application-specific integrated circuit (ASIC), or one or more integrated circuits, and is configured to execute a related program, so as to implement the technical solution provided in this embodiment of the present disclosure.

The bus 604 may include a path, and is configured to transfer information between components (such as the memory 601, the transceiver 602, and the processor 603) of the routing policy decider.

It should be noted that although the hardware shown in FIG. 6 presents merely the memory 601, the transceiver 602, the processor 603, and the bus 604, in a specific implementation process, a person skilled in the art shall understand that the routing policy decider further includes another component necessary for implementing normal running. In addition, according to a specific need, a person skilled in the art shall understand that a hardware component that implements another function may be further included.

When the routing policy decider shown in FIG. 6 is configured to implement the routing policy deciders shown in the embodiments in FIG. 2 and FIG. 3, the transceiver 602 of the routing policy decider is configured to receive computation environment information that are corresponding to a computation task and network information of each computation node, which are transferred by a scheduler platform, and provide the computation environment information to the network information of each computation node to the processor 603.

The processor 603 is connected to both the memory 601 and the transceiver 602, and is configured to decide a to-be-allocated bandwidth for the computation task according to the computation environment information; generate routing configuration policy information for the computation task according to the network information of each computation node, the decided to-be-allocated bandwidth, and the computation environment information; and provide the routing configuration policy information to the transceiver 602.

The transceiver 602 is configured to send the routing configuration policy information to a routing configuration controller.

Further, the processor 603 is further configured to, when a status of the computation task is changed from running to end or is changed from running to error, release, according to a second predetermined policy, a resource corresponding to the routing configuration policy information that is corresponding to the computation task.

Correspondingly, the transceiver 602 is further configured to receive the changed status of the computation task sent by the scheduler platform, and provide the changed status of the computation task to the processor 603, where the changed status of the computation task is any one of the following: running, pause, end, or error.

Further, optionally, the computation environment information includes bandwidth requirement information, where the bandwidth requirement information includes a computation task type and/or information about a required bandwidth. The processor 603 is configured to decide the to-be-allocated bandwidth for the computation task according to at least one piece of information in the bandwidth requirement information. In addition, when the computation environment information does not include the bandwidth requirement information, the processor 603 obtains a user level according to a user ID in the computation environment information and decides the to-be-allocated bandwidth for the computation task according to the user level.

Further, optionally, according to different information included in the computation environment information, the processor 603 generates the routing configuration policy information for the computation task in different manners, which are as follows.

Manner 1: If the computation environment information includes a status of the computation task, the processor 603 is configured to, when the status of the computation task is pause, generate the routing configuration policy information for the computation task according to the network information of each computation node and the decided to-be-allocated bandwidth during current routing configuration; or when the status of the computation task is running, generate the routing configuration policy information for the computation task according to the network information of each computation node and the decided to-be-allocated bandwidth and according to a first predetermined policy.

The first predetermined policy includes: (further, the computation environment information further includes a computation task priority) when the status of the computation task is running and the computation task priority is greater than or equal to a predetermined threshold, the processor 603 generates the routing configuration policy information for the computation task according to the network information of each computation node and the decided to-be-allocated bandwidth during current routing configuration, where the predetermined threshold is used to measure the computation task priority; or when the status of the computation task is running and the computation task priority is less than a predetermined threshold, the processor 603 generates the routing configuration policy information for the computation task according to the network information of each computation node and the decided to-be-allocated bandwidth when next routing configuration needs to be performed.

In this solution, a range of the predetermined threshold is not limited, and the predetermined threshold is determined according to level importance (priorities) of computation tasks.

Manner 2: If the computation environment information includes a computation task priority, the processor 603 is configured to, when the computation task priority is greater than or equal to a predetermined threshold, generate the routing configuration policy information for the computation task according to the network information of each computation node and the decided to-be-allocated bandwidth during current routing configuration, where the predetermined threshold is used to measure the computation task priority; or when the computation task priority is less than a predetermined threshold, the routing policy decider generates the routing configuration policy information for the computation task according to the network information of each computation node and the decided to-be-allocated bandwidth and according to a first predetermined policy.

The first predetermined policy in manner 2 is the same as the first predetermined policy in manner 1.

The first predetermined policy includes (further, when the computation environment information further includes a status of the computation task), when the computation task priority is less than the predetermined threshold and the status of the computation task is pause, the processor 603 generates the routing configuration policy information for the computation task according to the network information of each computation node and the decided to-be-allocated bandwidth during current routing configuration or when next routing configuration needs to be performed; or when the computation task priority is less than the predetermined threshold and the status of the computation task is running, the processor 603 generates the routing configuration policy information for the computation task according to the network information of each computation node and the decided to-be-allocated bandwidth when next routing configuration needs to be performed.

Further, optionally, the processor 603 generates the routing configuration policy information for the computation task according to the network information of each computation node, the decided to-be-allocated bandwidth, and the computation environment information, which includes the routing configuration policy information may include routing information corresponding to each computation node. Further, optionally, the routing configuration policy information may further include node bandwidth information, related to the routing information, corresponding to each computation node.

When the network information includes an IP address, a port number, and a MAC address that are corresponding to each computation node, the processor 603 generates the routing configuration policy information including the node bandwidth information corresponding to each computation node.

When the network information includes an IP address, a port number, and a MAC address that are corresponding to each computation node and information about communication between the computation nodes, the processor 603 generates the routing configuration policy information including inter-node bandwidth information of the computation nodes.

In this solution, routing control and/or resource reservation is performed for each computation task, which can avoid communication congestion between network devices during network resource processing.

Figure 7:
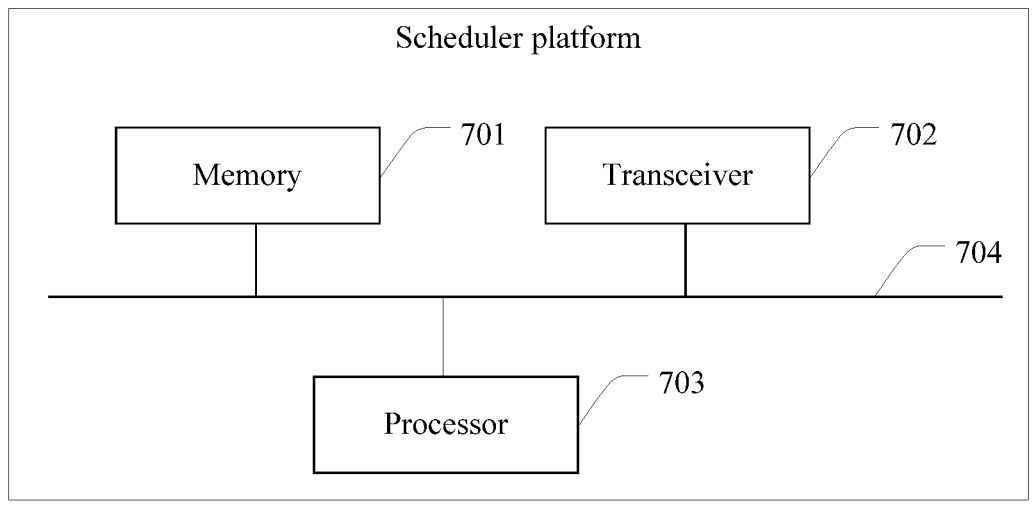
FIG. 7 is a hardware structure diagram of a scheduler platform in a network resource processing system according to an embodiment of the present disclosure.

As shown in FIG. 7, FIG. 7 is a hardware schematic structural diagram of a scheduler platform. The scheduler platform may include a memory 701, a transceiver 702, a processor 703, and a bus 704. The memory 701, the transceiver 702, and the processor 703 are communicatively connected using the bus 704.

For descriptions of common functions of the memory 701, the transceiver 702, the processor 703, and the bus 704 of the apparatus, refer to the descriptions of the memory 601, the transceiver 602, the processor 603, and the bus 604 that are included in the routing policy decider in FIG. 6, and details are not repeated herein.

It should be noted that although the hardware shown in FIG. 7 includes merely the memory 701, the transceiver 702, the processor 703, and the bus 704, in a specific implementation process, a person skilled in the art shall understand that the scheduler platform further includes another component necessary for implementing normal running. In addition, according to a specific need, a person skilled in the art shall understand that a hardware component that implements another function may be further included.

When the scheduler platform shown in FIG. 7 is used to implement the apparatuses shown in the embodiments in FIG. 4 and FIG. 5, the transceiver 702 of the apparatus is configured to receive computation task description information submitted by a UE, and provide the computation task description information to the processor 703, where the computation task description information includes a user ID and required information about a computation node.

The processor 703 is connected to both the memory 701 and the transceiver 702, and is configured to obtain, according to the computation task description information, a computation task corresponding to the user ID; decompose the computation task into at least one sub computation task according to the required information about the computation node; obtain network information of each corresponding computation node for processing each sub computation task, and provide the network information of each computation node to the transceiver 702; and generate computation environment information of the computation task according to the computation task description information, and provide the computation environment information to the transceiver 702, where the computation environment information is information that is necessary for a routing policy decider to generate routing configuration policy information corresponding to the computation task.

The transceiver 702 is configured to send the computation environment information and the network information of each computation node to the routing policy decider, so that the routing policy decider generates the routing configuration policy information according to the computation environment information, the network information of each computation node, and network topology information obtained by the routing policy decider.

Further, optionally, the transceiver 702 is further configured to send a respective corresponding sub computation task to each computation node, and provide sending completion information to the processor 703, where the sending completion information is used to notify the processor 703 that the at least one sub computation task has been sent.

Correspondingly, the processor 703 is further configured to designate a status of the computation task; and generate the computation environment information of the computation task according to the computation task description information and the status of the computation task.

Further, optionally, the computation task description information further includes a computation task level. The processor 703 is further configured to obtain a user level according to the user ID, and generate a computation task priority according to the user level and the computation task level. The user level may be subscription information of a user, or may be a service level given to a user according to subscription information of the user.

Further, the processor 703 generates the computation environment information according to the computation task description information and the computation task priority.

Further, optionally, the processor 703 is further configured to generate the computation environment information according to the computation task description information, the status of the computation task, and the computation task priority.

It can be understood that the computation task description information may include the user ID, the required information about the computation node, bandwidth requirement information (optional), computation task obtaining information (optional), and the computation task level (optional). The computation environment information includes at least one piece of the following information: the user ID, the required information about the computation node, the bandwidth requirement information, the status of the computation task, or the computation task priority.

Further, it should be noted that the processor 703 decomposes the computation task into at least one sub computation task according to the required information about the computation node, which includes the required information about the computation node includes configuration information of a computation node and a quantity of computation nodes, where the configuration information of the computation node may include a hardware configuration (a memory, a CPU, a network, or the like), a software configuration (an operating system type or an application library), or the like. It can be understood that the processor 703 decomposes the computation task into the at least one sub computation task according to the quantity of computation nodes.

Further, it should be noted that after the processor 703 decomposes the computation task into the at least one sub computation task, the transceiver 702 sends, to a computation resource manager, a computation node allocation request that carries the quantity of computation nodes and the configuration information of the computation node. After the computation resource manager configures the information about the computation node for the computation task according to content in the received computation node allocation request, and sends the configured information about the computation node to the scheduler platform, the transceiver 702 receives the information about the computation node sent by the computation resource manager, where the information about the computation node includes the network information of each computation node. The network information of each computation node includes one or more pieces of the following information: a remote access address, an IP address, a port number, or a MAC address corresponding to the computation node.

Further, optionally, the processor 703 is further configured to change the status of the computation task to obtain a changed status of the computation task, and provide the changed status of the computation task to the transceiver 702, where the changed status of the computation task is any one of the following: running, pause, end, or error. Then, the transceiver 702 sends the changed status of the computation task to the routing policy decider, where the changed status of the computation task is used for the routing policy decider to determine whether to release a resource corresponding to routing configuration policy information that is corresponding to the computation task.

This solution can avoid communication congestion between network devices during network resource processing.

Figure 8:
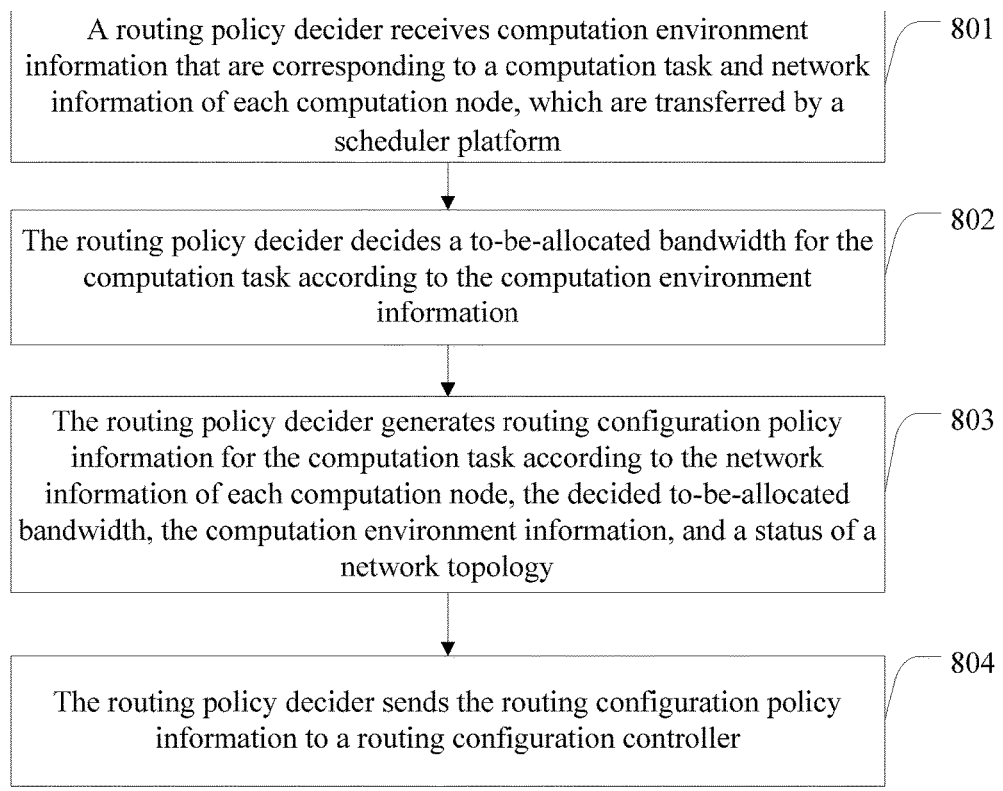
FIG. 8 is a flowchart of a network resource processing method according to an embodiment of the present disclosure.

FIG. 8 is a flowchart of a network resource processing method according to an embodiment of the present disclosure. The method in FIG. 8 may be executed by the apparatus 20 or 30 (that is, the routing policy decider) in FIG. 2 or FIG. 3.

801. The routing policy decider receives computation environment information that are corresponding to a computation task and network information of each computation node, which are transferred by a scheduler platform.

802. The routing policy decider decides a to-be-allocated bandwidth for the computation task according to the computation environment information.

803. The routing policy decider generates routing configuration policy information for the computation task according to the network information of each computation node, the decided to-be-allocated bandwidth, and the computation environment information.

804. The routing policy decider sends the routing configuration policy information to a routing configuration controller.

This embodiment of the present disclosure provides a network resource processing method. In the prior art, when data (a computation task) that requires more computation resources is being processed, after a scheduler platform delivers a quantity of computation subtasks to allocated computation nodes, a network device (for example, a switch or a router) can perform routing only according to a preconfigured static policy when there are more data exchanged between the computation nodes, resulting in a communication congestion problem between network devices. Compared with the problem, in this embodiment of the present disclosure, a scheduler platform sends obtained computation environment information and obtained network information of each computation node to a routing policy decider; the routing policy decider generates routing configuration policy information according to the computation environment information and the network information of each computation node that are provided by the scheduler platform; then, the routing policy decider delivers the routing configuration policy information to a routing configuration controller, so that a switch (a network device) finally transmits data via the routing configuration controller, thereby avoiding communication congestion between network devices during network resource processing.

It should be noted that a specific device for the routing configuration controller is not limited in this solution. Preferably, the routing configuration controller in this embodiment may be an OFC.

Further, optionally, the computation environment information in step 801 includes at least one piece of the following information: a user ID, a status of the computation task, a computation task priority, and bandwidth requirement information.

Further, optionally, in step 802, when the computation environment information includes the bandwidth requirement information, the routing policy decider decides the to-be-allocated bandwidth for the computation task according to a computation task type and/or information about a required bandwidth in the bandwidth requirement information. In addition, when the computation environment information does not include the bandwidth requirement information, the routing policy decider obtains a user level according to the user ID in the computation environment information and decides the to-be-allocated bandwidth for the computation task according to the user level.

Further, optionally, in step 803, according to different information included in the computation environment information, the routing policy decider generates the routing configuration policy information for the computation task in different manners, which are as follows:

Manner 1: If the computation environment information includes a status of the computation task, when the status of the computation task is pause, the routing policy decider generates the routing configuration policy information for the computation task according to the network information of each computation node and the decided to-be-allocated bandwidth during current routing configuration; or when the status of the computation task is running, the routing policy decider generates the routing configuration policy information for the computation task according to the network information of each computation node and the decided to-be-allocated bandwidth and according to a first predetermined policy.

The network information of each computation node includes an IP address and a port number that are corresponding to the computation node. Further, the computation environment information further includes a computation task priority.

The first predetermined policy includes, when the status of the computation task is running and the computation task priority is greater than or equal to a predetermined threshold, the routing policy decider generates the routing configuration policy information for the computation task according to the network information of each computation node and the decided to-be-allocated bandwidth during current routing configuration, where the predetermined threshold is used to measure the computation task priority; or when the status of the computation task is running and the computation task priority is less than a predetermined threshold, the routing policy decider generates the routing configuration policy information for the computation task according to the network information of each computation node and the decided to-be-allocated bandwidth when next routing configuration needs to be performed.

In this solution, a specific manner of the first predetermined policy is not limited. For example, when the status of the computation task is running, but the computation task priority is greater than or equal to the predetermined threshold, the routing policy decider may generate the routing configuration policy information for the computation task during current routing configuration. Similarly, the first predetermined policy may be the routing policy decider generates the routing configuration policy information for the computation task when next routing configuration needs to be performed. It can be understood that the next routing configuration that needs to be performed may be performed at the same time when the routing policy decider generates new routing configuration policy information for a computation task, where the new routing configuration policy information is generated taking into consideration information related to the computation task, so that the new routing configuration policy information is applicable to a processing operation of the computation task.

Similarly, in this solution, a range of the predetermined threshold is not limited, and the predetermined threshold is determined according to level importance (priorities) of computation tasks.

Manner 2: If the computation environment information includes a computation task priority, when the computation task priority is greater than or equal to a predetermined threshold, the routing policy decider generates the routing configuration policy information for the computation task according to the network information of each computation node and the decided to-be-allocated bandwidth during current routing configuration, where the predetermined threshold is used to measure the computation task priority; or when the computation task priority is less than a predetermined threshold, the routing policy decider generates the routing configuration policy information for the computation task according to the network information of each computation node and the decided to-be-allocated bandwidth and according to a first predetermined policy.

The first predetermined policy in manner 2 is the same as the first predetermined policy in manner 1. The first predetermined policy includes further, when the computation task priority is less than the predetermined threshold and the status of the computation task is pause, the routing policy decider generates the routing configuration policy information for the computation task according to the network information of each computation node and the decided to-be-allocated bandwidth during current routing configuration or when next routing configuration needs to be performed; or when the computation task priority is less than the predetermined threshold and the status of the computation task is running, the routing policy decider generates the routing configuration policy information for the computation task according to the network information of each computation node and the decided to-be-allocated bandwidth when next routing configuration needs to be performed.

It should be noted that in the two manners of generating, by the routing policy decider, the routing configuration policy information for the computation task according to the network information of each computation node, the decided to-be-allocated bandwidth, and the computation environment information, preferentially considered conditions are different.

In manner 1, the status of the computation task is considered preferentially. When the status of the computation task is pause, the routing policy decider performs, during current routing configuration, an operation of generating the routing configuration policy information corresponding to the computation task. When the status of the computation task is running, the routing policy decider then considers whether the computation task priority is greater than or equal to the predetermined threshold, and when the computation task priority is greater than or equal to the predetermined threshold, the routing policy decider performs, during current routing configuration, an operation of generating the routing configuration policy information corresponding to the computation task; or when the computation task priority is less than the predetermined threshold, the routing policy decider performs, when next routing configuration needs to be performed, an operation of generating the routing configuration policy information corresponding to the computation task.

In manner 2, the computation task priority is considered preferentially. When the computation task priority is greater than or equal to the predetermined threshold, the routing policy decider performs, during current routing configuration, an operation of generating the routing configuration policy information corresponding to the computation task. When the computation task priority is less than the predetermined threshold, the routing policy decider then considers whether the status of the computation task is running or pause, and when the status of the computation task is pause, the routing policy decider performs, during current routing configuration or when next routing configuration needs to be performed, an operation of generating the routing configuration policy information corresponding to the computation task; or when the status of the computation task is running, the routing policy decider performs, when next routing configuration needs to be performed, an operation of generating the routing configuration policy information corresponding to the computation task.

According to the two manners, there are two network resource processing methods. Method 1: After the scheduler platform delivers each sub computation task obtained through decomposition to a corresponding computation node, the routing policy decider preferentially configures routing configuration policy information corresponding to the computation task, and notifies, after the configuration is complete, the scheduler platform of completion of the configuration, so that the computation node starts processing the respective sub computation task. The notifying, after the configuration is complete, the scheduler platform of completion of the configuration may be notifying, by the routing policy decider after receiving a configuration success response from a switch, the scheduler platform of completion of the configuration. The routing policy decider sends the generated routing configuration policy information to the routing configuration controller, so that after converting the routing configuration policy information into OpenFlow configuration policy information, the routing configuration controller sends the OpenFlow configuration policy information to the switch, and the switch reserves a resource and performs routing control according to the OpenFlow configuration policy information.

It should be noted that because the routing policy decider generates dynamic routing configuration policy information according to the computation environment information, the network information of each computation node, and real-time network topology information, the switch may reserve a resource and perform routing control according to the generated dynamic routing configuration policy information, thereby avoiding communication congestion during data transmission. Method 1 is used when the user level is high or the computation task priority is high.

Method 2: After the scheduler platform delivers each sub computation task obtained through decomposition to a corresponding computation node, the computation node starts performing an operation of processing the respective sub computation task, and the routing policy decider decides, according to content of the computation environment information, when to generate the routing configuration policy information corresponding to the computation task. An operation performed after the routing policy decider generates the routing configuration policy information is the same as that in method 1. A difference includes that in the first network resource processing method, the computation node starts processing the respective sub computation task after the routing policy decider completes the configuration of the routing configuration policy information, and then, the switch performs routing control and/or resource reservation according to the generated dynamic OpenFlow configuration policy information (in this case, QoS guarantees are provided for data communication for the computation task). In the second network resource processing method, executing a respective received sub computation task by each computation node and allocating the routing configuration policy information for the computation task are concurrent processes. A specific delay (a length of the delay is decided by the routing policy decider) is required for loading and taking effect of the routing configuration policy information. Therefore, before loading and taking effect of the routing configuration policy information allocated for the computation task, if there is a communication requirement for the computation task during execution, routing control and transmission control are performed for the computation task according to an existing routing configuration policy previously configured by the switch (in this case, no QoS guarantee is provided for data communication for the computation task).

It should be noted that method 2 is used when the user level is low or the computation task priority is low. In this method, frequent network changes are reduced to the greatest extent to ensure network communication for a computation task and improve utilization of a network resource.

Further, optionally, in step 803, when the network information includes an IP address, a port number, and a MAC address that are corresponding to each computation node, the routing policy decider generates the routing configuration policy information including the node bandwidth information corresponding to each computation node.

When the network information includes an IP address, a port number, and a MAC address that are corresponding to each computation node and information about communication between the computation nodes, the routing policy decider generates the routing configuration policy information including inter-node bandwidth information of the computation nodes.

Further, optionally, after step 803, the method further includes receiving, by the routing policy decider, a changed status of the computation task sent by the scheduler platform, where the changed status of the computation task is any one of the following: running, pause, end, or error; and when the status of the computation task is changed from running to end or is changed from running to error, releasing, by the routing policy decider according to a second predetermined policy, a resource corresponding to the routing configuration policy information that is corresponding to the computation task.

That is, the status of the computation task is reference information for the routing policy decider when reserving a network resource (for example, a bandwidth) or releasing a network resource. When the status of the computation task is running or pause, the routing policy decider reserves and stores a network resource allocated for the computation task; when the status of the computation task is end or error, the routing policy decider releases a network resource allocated for the computation task. Therefore, utilization of a network resource is improved.

Figure 9:
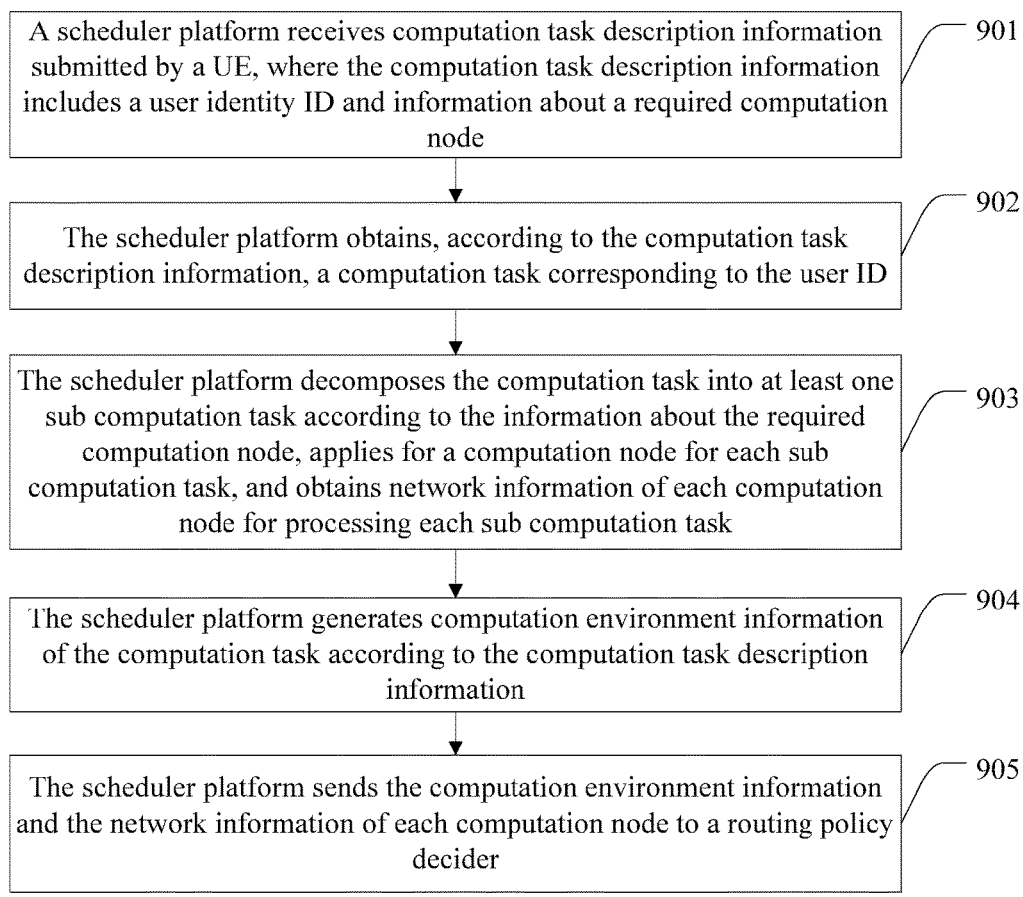
FIG. 9 is a flowchart of a network resource processing method according to an embodiment of the present disclosure.

FIG. 9 is a flowchart of a network resource processing method according to an embodiment of the present disclosure. The method in FIG. 9 may be implemented by the apparatus 40 or 50 (that is, the scheduler platform) in FIG. 4 or FIG. 5.

901. The scheduler platform receives computation task description information submitted by a UE, where the computation task description information includes a user identity ID and required information about a computation node.

902. The scheduler platform obtains, according to the computation task description information, a computation task corresponding to the user ID.

903. The scheduler platform decomposes the computation task into at least one sub computation task according to the required information about the computation node, applies for a computation node for each sub computation task, and obtains network information of each corresponding computation node for processing each sub computation task.

904. The scheduler platform generates computation environment information of the computation task according to the computation task description information.

905. The scheduler platform sends the computation environment information and the network information of each computation node to a routing policy decider.

In this solution, a scheduler platform sends obtained computation environment information and obtained network information of each computation node to a routing policy decider, the routing policy decider generates routing configuration policy information according to the computation environment information and the network information of each computation node that are provided by the scheduler platform, and then, the routing policy decider delivers the routing configuration policy information to a routing configuration controller, so that a switch (a network device) finally performs routing control and/or resource reservation according to OpenFlow configuration policy information obtained through conversion by the routing configuration controller, thereby avoiding communication congestion between network devices during network resource processing.

Further, optionally, in step 902, the scheduler platform obtains the computation task corresponding to the user ID in two manners, which includes the following.

Manner 1: The scheduler platform receives a computation task data packet sent by the UE, where the computation task data packet includes the computation task description information; and parses the computation task data packet according to the computation task description information to obtain the computation task.

Manner 2: The scheduler platform obtains the computation task according to a computation task obtaining address or obtaining manner in the computation task description information.

Further, optionally, in step 903, the decomposing, by the scheduler platform, the computation task into at least one sub computation task according to the required information about the computation node includes the required information about the computation node includes configuration information of a computation node and a quantity of computation nodes, where the configuration information of the computation node may include a hardware configuration (a memory, a CPU, a network, or the like), a software configuration (an operating system type or an application library), or the like. It can be understood that the scheduler platform decomposes the computation task into the at least one sub computation task according to the quantity of computation nodes.

Further, optionally, after the decomposing, by the scheduler platform, the computation task into at least one sub computation task according to the required information about the computation node, further includes sending, by the scheduler platform to a computation resource manager, a computation node allocation request that carries the quantity of computation nodes and the configuration information of the computation node, so that the computation resource manager configures the information about the computation node for the computation task according to content in the computation node allocation request, and then sends the configured information about the computation node to the scheduler platform.

Correspondingly, the scheduler platform receives the information about the computation node sent by the computation resource manager, where the information about the computation node includes the network information of each computation node. That is, the scheduler platform obtains the network information of each computation node. The network information of each computation node includes one or more pieces of the following information: a remote access address, an Internet IP address, a port number, or a MAC address corresponding to the computation node.

When the network information includes the IP address, the port number, and the MAC address that are corresponding to each computation node, routing configuration policy information generated by the routing policy decider includes node bandwidth information corresponding to each computation node.

When the network information includes the IP address, the port number, and the MAC address that are corresponding to each computation node and information about communication between the computation nodes, routing configuration policy information generated by the routing policy decider includes inter-node bandwidth information of the computation nodes.

It should be noted that the routing configuration policy information may include routing information corresponding to each computation node. Further, optionally, the routing configuration policy information may further include node bandwidth information, related to the routing information, corresponding to each computation node.

Further, optionally, after the obtaining the network information of each computation node by the scheduler platform, further includes sending, by the scheduler platform, a respective corresponding sub computation task to each computation node, and designating a status of the computation task.

It should be noted that after the scheduler platform sends the respective corresponding sub computation task to each computation node, when the scheduler platform designates the status of the computation task as pause, each computation node suspends processing of the respective corresponding sub computation task; when the scheduler platform designates the status of the computation task as running, each computation node processes the respective corresponding sub computation task.

Certainly, the status of the computation task further includes error or end. The two states are both a feedback provided by the computation node to the scheduler platform. When the two states occur, each computation node stops processing the respective corresponding sub computation task.

Further, optionally, after step 901, the scheduler platform obtains a user level according to the user ID, and then the scheduler platform generates a computation task priority according to the user level and a computation task level.

Further, optionally, in step 904, the scheduler platform generates the computation environment information of the computation task according to the computation task description information and the status of the computation task.

Further, optionally, in step 904, the scheduler platform generates the computation environment information according to the computation task description information and the computation task priority.

It can be understood that the computation task description information may include the user ID, the required information about the computation node, bandwidth requirement information (optional), computation task obtaining information (optional), and the computation task level (optional). The computation environment information includes at least one piece of the following information: the user ID, the required information about the computation node, the bandwidth requirement information, the status of the computation task, or the computation task priority.

Further, optionally, after step 905, the scheduler platform changes the status of the computation task to obtain a changed status of the computation task, where the changed status of the computation task is any one of the following: running, pause, end, or error. Then, the scheduler platform sends the changed status of the computation task to the routing policy decider, where the changed status of the computation task is used for the routing policy decider to determine whether to release a resource corresponding to routing configuration policy information that is corresponding to the computation task.

Figure 10A:
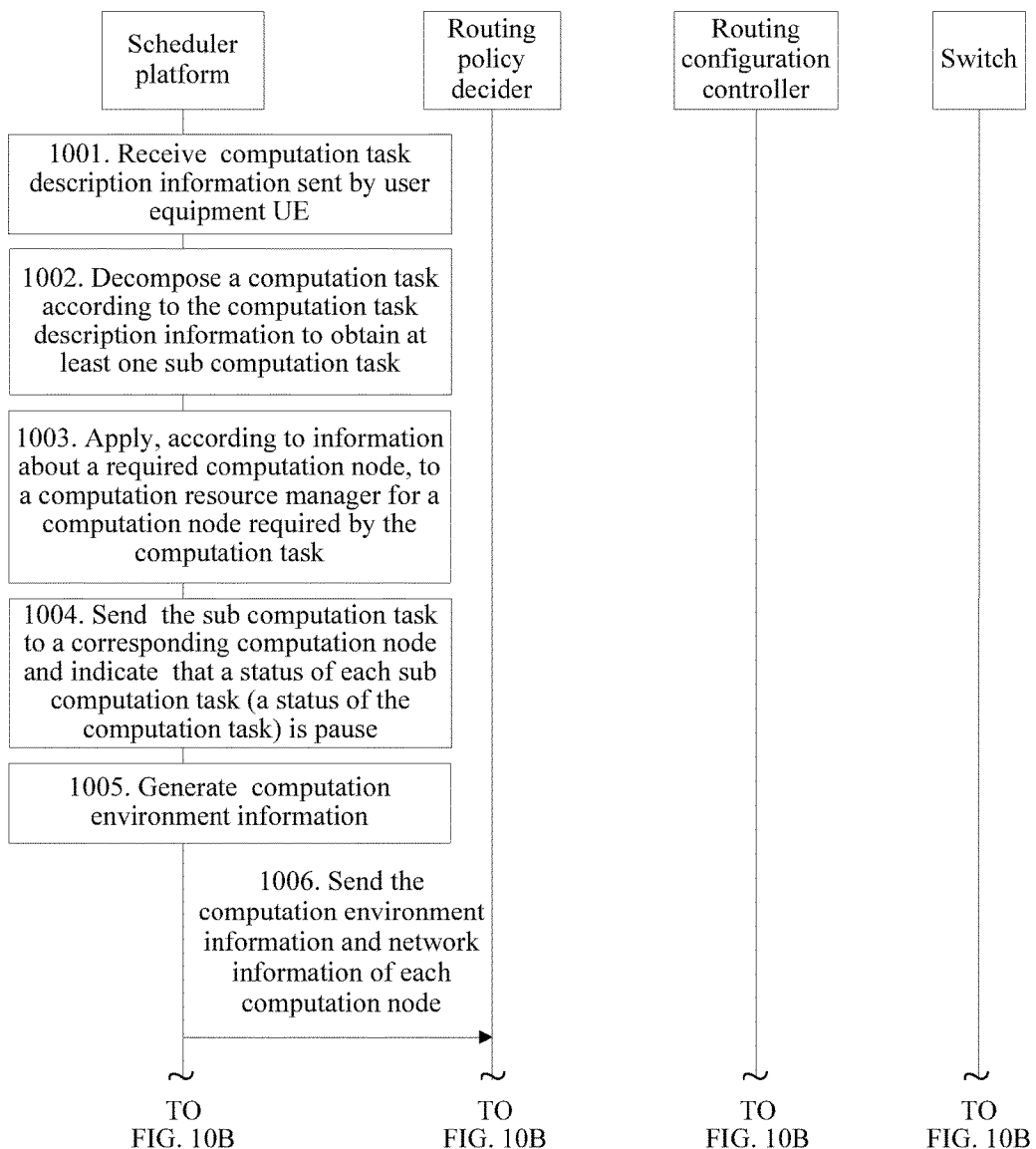
FIG. 10A and FIG. 10B are a flowchart of a network resource processing method in which routing configuration policy information is first configured and a computation task is then processed according to an embodiment of the present disclosure.
Figure 10B:
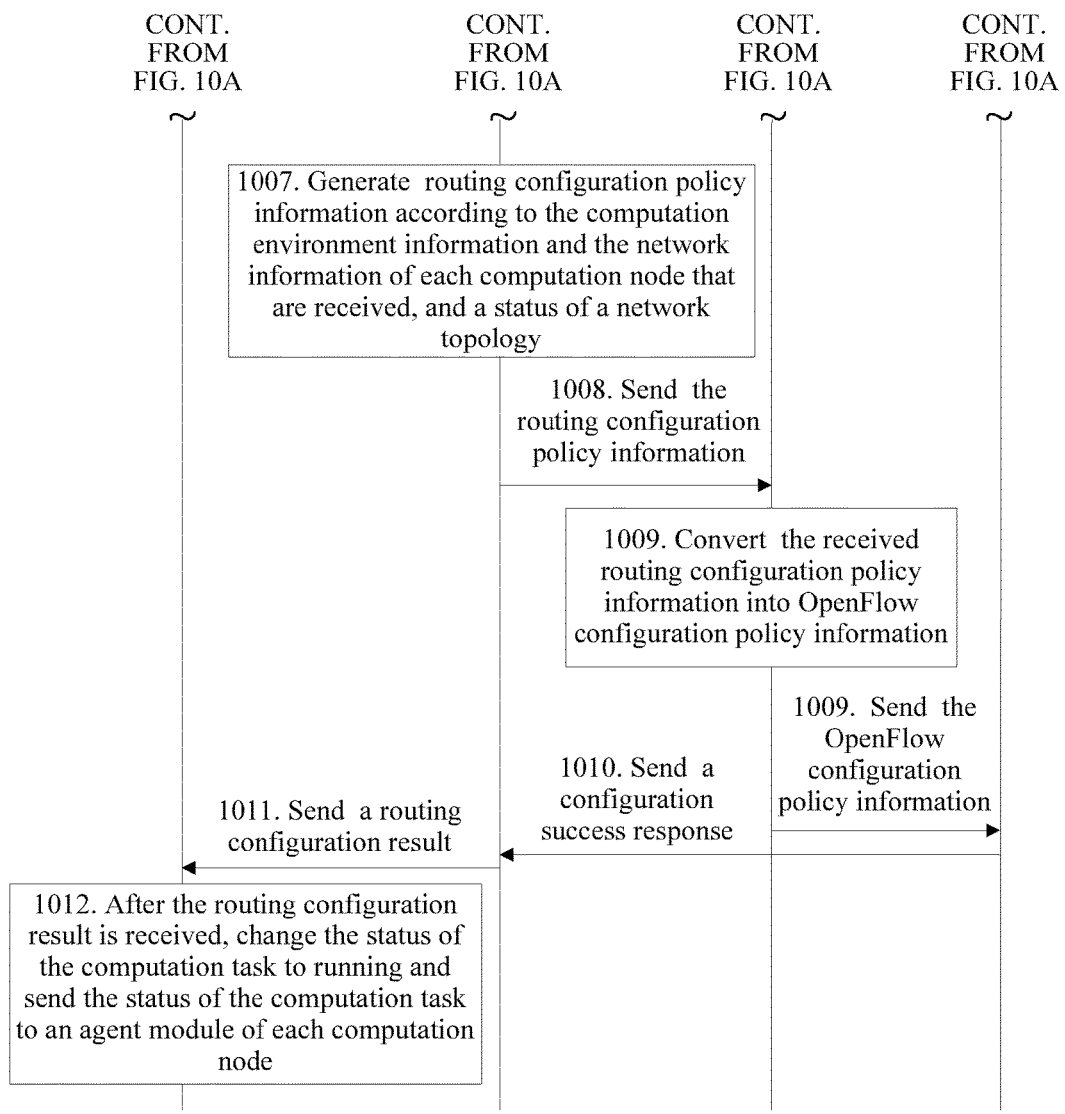

FIG. 10A and FIG. 10B are a flowchart of a network resource processing method in which routing configuration policy information is first configured and a computation task is then processed according to an embodiment of the present disclosure.

1001. A scheduler platform receives computation task description information sent by a UE.

The computation task description information may include a user ID, required information about a computation node, bandwidth requirement information (optional), computation task obtaining information (optional), and a computation task level (optional).

1002. The scheduler platform decomposes a computation task according to the computation task description information to obtain at least one sub computation task.

The scheduler platform determines, according to the computation task description information, the information about the computation node required by the computation task. The required information about the computation node includes configuration information of a computation node and a quantity of computation nodes, where the configuration information of the computation node may include a hardware configuration (a memory, a CPU, a network, or the like), a software configuration (an operating system type or an application library), or the like. Then, the scheduler platform decomposes, according to the quantity of computation nodes, the computation task into sub computation tasks corresponding to the quantity of computation nodes. It can be understood that the quantity of computation nodes is equal to the quantity of sub computation tasks.

1003. The scheduler platform applies, according to required information about a computation node, to a computation resource manager for a computation node required by the computation task.

The scheduler platform sends, to the computation resource manager, a computation node allocation request that carries the quantity of computation nodes and the configuration information of the computation node; and then, receives the information about the computation node sent by the computation resource manager, where the information about the computation node includes network information of each computation node.

1004. The scheduler platform sends the sub computation task to a corresponding computation node and indicates that a status of each sub computation task (a status of the computation task) is pause.

In the prior art, after the scheduler platform delivers a respective corresponding sub computation task to each computation node, a status of the corresponding sub computation task is generally running; in this case, each computation node starts processing the respective corresponding sub computation task.

1005. The scheduler platform generates computation environment information.

The computation environment information includes at least one piece of the following information: the user ID, the required information about the computation node, the bandwidth requirement information, a status of the computation task, or a computation task priority.

1006. The scheduler platform sends the computation environment information and network information of each computation node to a routing policy decider.

1007. The routing policy decider generates routing configuration policy information according to the computation environment information and the network information of each computation node that are received.

1008. The routing policy decider sends the routing configuration policy information to a routing configuration controller.

It can be understood that the routing configuration controller in this embodiment may be an OFC.

1009. The routing configuration controller converts the received routing configuration policy information into OpenFlow configuration policy information, and then sends to a managed switch for performing configuration.

A type of the switch is not limited in this solution. Preferably, the switch in this embodiment may be an OFS.

1010. The switch sends a configuration success response to the routing policy decider after receiving the OpenFlow configuration policy information.

The configuration success response is used to notify the routing policy decider that the switch has received the OpenFlow configuration policy information.

1011. The routing policy decider sends a routing configuration result to the scheduler platform.

The routing configuration result is used to notify the scheduler platform that the routing configuration policy information corresponding to the computation task has been completed. Optionally, the routing configuration result may include the routing configuration policy information.

1012. After receiving the routing configuration result, the scheduler platform changes the status of the computation task to running and sends the status of the computation task to an agent module of each computation node.

After learning the status of the computation task, each computation node starts processing a respective received sub computation task.

After receiving the OpenFlow configuration policy information, the switch may perform resource reservation and data routing according to the OpenFlow configuration policy information. It can be understood that the OpenFlow configuration policy information is dynamic network policy information, which can avoid communication congestion when the switch transmits data.

In the manner of first configuring routing configuration policy information and then processing a computation task, the routing configuration policy information may be dynamically generated for the computation task if a current network topology is known clearly. The routing configuration policy information can avoid communication congestion.

Figure 11A:
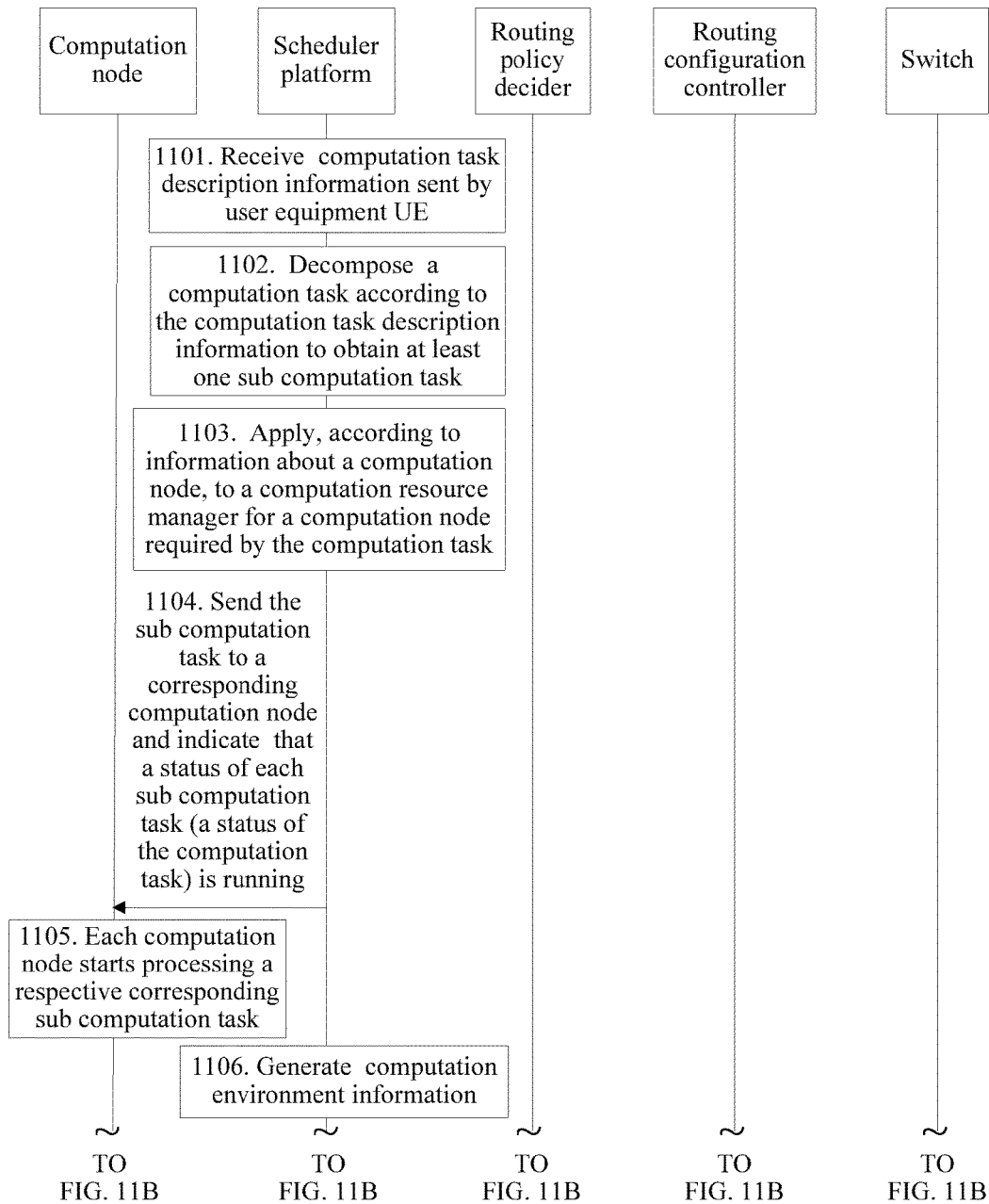
FIG. 11A and FIG. 11B are a flowchart of a network resource processing method in which a computation task and configuration of routing configuration policy information are concurrently processed according to an embodiment of the present disclosure.
Figure 11B:
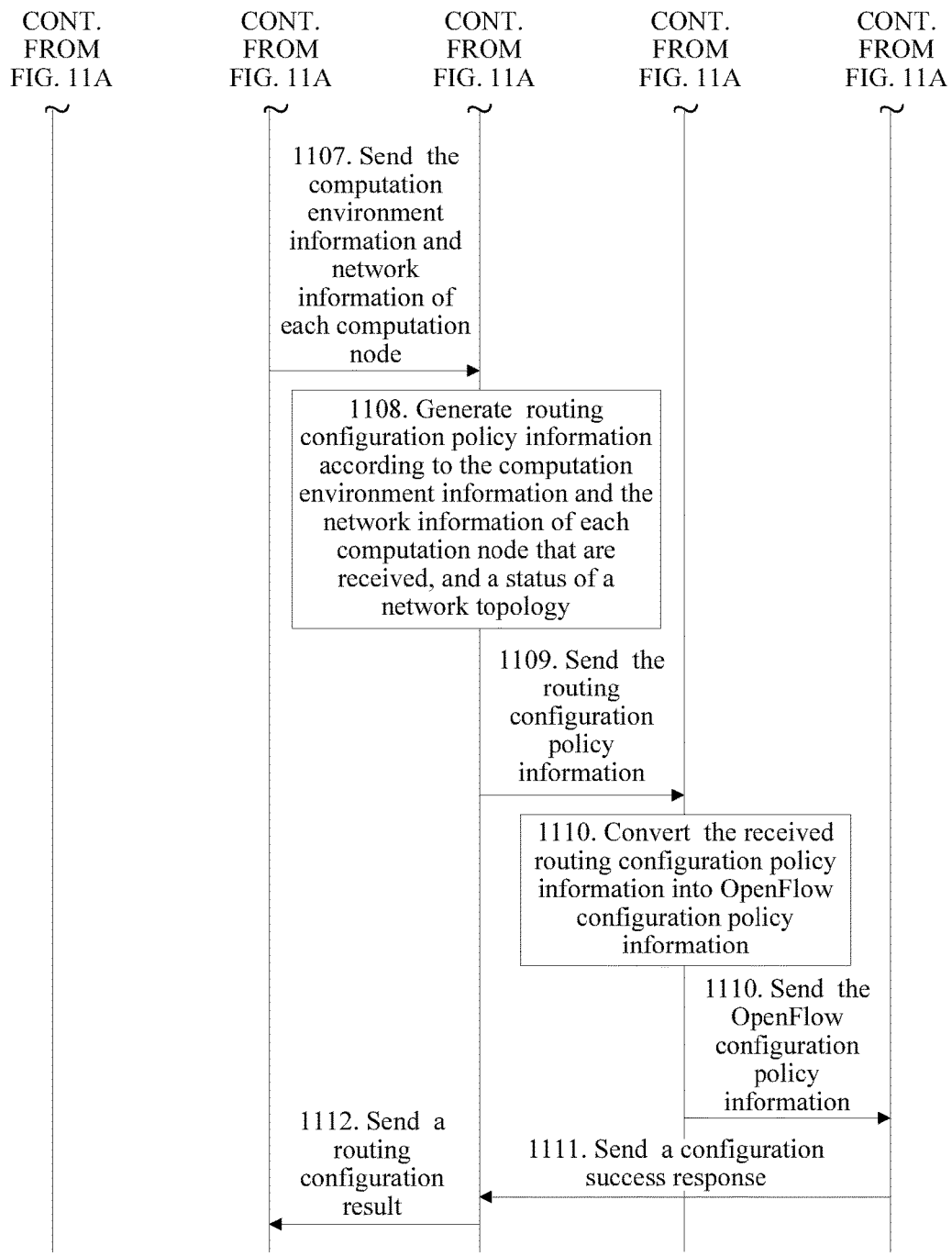

FIG. 11A and FIG. 11B are a flowchart of a network resource processing method in which a computation task and configuration of routing configuration policy information are concurrently processed according to an embodiment of the present disclosure.

1101. A scheduler platform receives computation task description information sent by a UE.

1102. The scheduler platform decomposes a computation task according to the computation task description information to obtain at least one sub computation task.

1103. The scheduler platform applies, according to information about a computation node, to a computation resource manager for a computation node required by the computation task.

1104. The scheduler platform sends the sub computation task to a corresponding computation node and indicates that a status of each sub computation task (a status of the computation task) is running.

1105. Each computation node starts processing a respective corresponding sub computation task.

Each computation node directly processes the respective corresponding sub computation task after receiving the respective corresponding sub computation task.

1106. The scheduler platform generates computation environment information.

1107. The scheduler platform sends the computation environment information and network information of each computation node to a routing policy decider.

1108. The routing policy decider generates routing configuration policy information according to the computation environment information and the network information of each computation node that are received.

1109. The routing policy decider sends the routing configuration policy information to a routing configuration controller.

It can be understood that the routing configuration controller in this embodiment may be an OFC.

1110. The routing configuration controller converts the received routing configuration policy information into OpenFlow configuration policy information, and then sends the OpenFlow configuration policy information to a managed switch for performing configuration.

A type of the switch is not limited in this solution. Preferably, the switch in this embodiment may be an OFS.

1111. The switch sends a configuration success response to the routing policy decider after receiving the OpenFlow configuration policy information.

1112. The routing policy decider sends a routing configuration result to the scheduler platform.

It can be understood that in this step, for the scheduler platform, a purpose of the routing configuration result sent by the routing policy decider is merely to learn whether the routing policy decider has generated the routing configuration policy information, but not to affect the status of the computation task.

In the manner of concurrently processing a computation task and configuring routing configuration policy information, after a scheduler platform receives the computation task and when no routing configuration policy information is generated, each computation node directly processes a respective corresponding sub computation task, and each computation node and each switch do not need to wait for generation of the routing configuration policy information, so that a routing policy decider can adjust a network according to a policy of the routing policy decider, without adjusting the network instantly, thereby reducing network instability caused by frequent network adjustment.

It should be noted that the manner of first configuring routing configuration policy information and then processing a computation task is used when a priority of a computation task is relatively high, and the manner can ensure reliability of processing a computation task. The manner of concurrently processing a computation task and configuring routing configuration policy information is used when a priority of a computation task is relatively low, and the manner can improve utilization of a network resource.

In addition, in the present disclosure, the manner of first configuring routing configuration policy information and then processing a computation task may also be used in combination with the manner of concurrently processing a computation task and configuring routing configuration policy information. That is, when there are multiple computation tasks on a scheduler platform, according to a user priority, priorities of the computation tasks, or another local policy, some computation tasks may be processed in the manner of first configuring routing configuration policy information and then processing a computation task, and the other computation tasks may be processed in the manner of concurrently processing a computation task and configuring routing configuration policy information.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A routing policy decider, comprising:
    a processor;
    a transceiver coupled to the processor and configured to:
        receive computation environment information that are corresponding to a computation task and network information of each computation node, which are transferred by a scheduler platform; and
        provide the computation environment information and the network information of each computation node to the processor, the network information of each computation node comprising an Internet Protocol (IP) address and a port number that are corresponding to the computation node, the computation environment information further comprising a computation task priority,
    the processor being configured to:
        decide a to-be-allocated bandwidth for the computation task according to the computation environment information;
        generate, when the computation task priority is greater than or equal to a predetermined threshold, routing configuration policy information for the computation task according to the network information of each computation node and the decided to-be-allocated bandwidth, the predetermined threshold being used to measure the computation task priority;
        generate, when the computation task priority is less than a predetermined threshold, the routing configuration policy information for the computation task according to the network information of each computation node and the decided to-be-allocated bandwidth and according to a first predetermined policy; and
        provide the routing configuration policy information to the transceiver,
    the transceiver being further configured to send the routing configuration policy information to a routing configuration controller.

2. The routing policy decider according to claim 1, wherein the computation environment information comprises bandwidth requirement information, and the processor being configured to decide the bandwidth for the computation task according to the bandwidth requirement information.

3. The routing policy decider according to claim 1, wherein the computation environment information comprises a status of the computation task, the routing configuration policy information for the computation task being generated according to the network information of each computation node and the decided to-be-allocated bandwidth when the status of the computation task is pause, and the routing configuration policy information for the computation task being generated according to the network information of each computation node and the decided to-be-allocated bandwidth and according to the first predetermined policy when the status of the computation task is running.

4. The routing policy decider according to claim 1, wherein the computation environment information further comprises a status of the computation task, and the processor being further configured to:
    generate, when the computation task priority is less than the predetermined threshold and the status of the computation task is pause, the routing configuration policy information for the computation task according to a predetermined time and according to the network information of each computation node and the decided to-be-allocated bandwidth during current routing configuration or when next routing configuration needs to be performed; and
    generate, when the computation task priority is less than the predetermined threshold and the status of the computation task is running, the routing configuration policy information for the computation task according to the network information of each computation node and the decided to-be-allocated bandwidth when next routing configuration needs to be performed.

5. The routing policy decider according to claim 1, wherein the transceiver is further configured to:
    receive a changed status of the computation task from the scheduler platform; and
    provide the changed status of the computation task to the processor, the changed status of the computation task being any one of the following: running, pause, end, or error, and
    the processor being configured to release, according to a second predetermined policy, a resource corresponding to the routing configuration policy information that is corresponding to the computation task when the status of the computation task is changed from running to end or is changed from running to error.

6. A scheduler platform, comprising:
    a transceiver configured to:
        receive computation task description information submitted by user equipment (UE); and
        provide the computation task description information to a processor, the computation task description information comprising a user identity (ID) and required information about a computation node;
    the processor being configured to:
        obtain, according to the computation task description information, a computation task corresponding to the user ID;
        change the status of the computation task to obtain a changed status of the computation task;

provide the changed status of the computation task to the transceiver, the changed status of the computation task being any one of the following: running, pause, end, or error;

decompose the computation task into at least one sub computation task according to the required information about the computation node;

obtain network information of each corresponding computation node for processing each sub computation task;

provide the network information of each computation node to the transceiver;

generate computation environment information of the computation task according to the computation task description information; and provide the computation environment information to the transceiver, the transceiver being further configured to:
send the computation environment information and the network information of each computation node to a routing policy decider; and send the changed status of the computation task to the routing policy decider, the changed status of the computation task being used for the routing policy decider to determine whether to release a resource corresponding to the routing configuration policy information that is corresponding to the computation task.

7. The scheduler platform according to claim 6, wherein the network information of each computation node comprises an Internet Protocol (IP) address and a port number that are corresponding to the computation node, the transceiver being further configured to:
send a respective corresponding sub computation task to each computation node according to the network information of each computation node; and provide sending completion information to the processor, sending completion information being used to notify the processor that the at least one sub computation task has been sent, and the processor being further configured to:
designate a status of the computation task; and generate the computation environment information of the computation task according to the computation task description information and the status of the computation task.

8. The scheduler platform according to claim 6, wherein the computation task description information further comprises a computation task level, and the processor being further configured to:
obtain a user level according to the user ID; and generate a computation task priority according to the user level and the computation task level.

9. The scheduler platform according to claim 8, wherein the processor is further configured to generate the computation environment information according to the computation task description information and the computation task priority, or the processor being further configured to generate the computation environment information according to the computation task description information, the status of the computation task, and the computation task priority.

10. The scheduler platform according to claim 8, wherein the computation task description information further comprises bandwidth requirement information, and wherein the computation environment information comprising at least one piece of the following information: the user ID, the required information about the computation node, the bandwidth requirement information, the status of the computation task, or the computation task priority.

11. A network resource processing system, comprising:
a routing policy decider configured to:
receive computation environment information that are corresponding to a computation task and network information of each computation node, which are transferred by a scheduler platform;

decide a to-be-allocated bandwidth for the computation task according to the computation environment information;

generate routing configuration policy information for the computation task according to the network information of each computation node, the decided to-be-allocated bandwidth, and the computation environment information; and send the routing configuration policy information to a routing configuration controller, the scheduler platform being configured to:
receive computation task description information submitted by user equipment (UE), the computation task description information comprising a user identity (ID) and required information about a computation node;

obtain, according to the computation task description information, a computation task corresponding to the user ID;

decompose the computation task into at least one sub computation task according to the required information about the computation node, apply for a computation node for each sub computation task, and obtain the network information of each corresponding computation node for processing each sub computation task;

generate the computation environment information of the computation task according to the computation task description information; and send the computation environment information and the network information of each computation node to the routing policy decider, and the routing configuration controller being configured to:
receive the routing configuration policy information from the routing policy decider;

convert the received routing configuration policy information into OpenFlow configuration policy information; and send the OpenFlow configuration policy information to a switch, and the switch being configured to:
receive the OpenFlow configuration policy information from the routing configuration controller; and perform routing control for the computation task according to the OpenFlow configuration policy information.

12. The network resource processing system according to claim 11, wherein the required information about the computation node comprises a quantity of computation nodes and configuration information of the computation node, the system further comprising a computation resource manager, the computation resource manager being configured to:
receive a computation node allocation request that carries the required information about the computation node and that is from the scheduler platform; and allocate a computation node for the computation task according to the quantity of computation nodes and the configuration information of the computation node that are in the computation node allocation request, and return the information about the computation node to the scheduler platform, the information about the computation node comprising the network information of each computation node, the computation node being configured to receive a sub computation task from the scheduler platform, and the scheduler platform being further configured to:
- send, to the computation resource manager, the computation node allocation request that carries the quantity of computation nodes and the configuration information of the computation node; and
- receive the information about the computation node from the computation resource manager.

* * * * *